(12) United States Patent
Schumacher

(10) Patent No.: US 11,932,493 B2
(45) Date of Patent: Mar. 19, 2024

(54) CHAINWHEEL, DRUM MOTOR, SEMI-FINISHED CHAINWHEEL PRODUCT AND METHOD FOR PRODUCING A CHAINWHEEL

(71) Applicant: Interroll Holding AG, Sant' Antonino (CH)

(72) Inventor: Jürgen Schumacher, Sant' Antonino (CH)

(73) Assignee: Interroll Holding AG, Sant' Antonino (CH)

( * ) Notice: Subject to any disclaimer, the term of this patent is extended or adjusted under 35 U.S.C. 154(b) by 255 days.

(21) Appl. No.: 17/616,684

(22) PCT Filed: Jun. 19, 2020

(86) PCT No.: PCT/EP2020/067223
§ 371 (c)(1),
(2) Date: Dec. 6, 2021

(87) PCT Pub. No.: WO2020/260167
PCT Pub. Date: Dec. 30, 2020

(65) Prior Publication Data
US 2022/0306395 A1    Sep. 29, 2022

(30) Foreign Application Priority Data

Jun. 27, 2019   (DE) .......................... 102019117394.9

(51) Int. Cl.
*B65G 23/06* (2006.01)
*B65G 17/08* (2006.01)
*B65G 17/24* (2006.01)
*F16H 55/17* (2006.01)

(52) U.S. Cl.
CPC ........... *B65G 23/06* (2013.01); *F16H 55/171* (2013.01)

(58) Field of Classification Search
None
See application file for complete search history.

(56) References Cited

U.S. PATENT DOCUMENTS

| 4,722,722 A | 2/1988 | Rampe |
| 5,322,478 A | 6/1994 | Bos |
| 7,556,143 B2 * | 7/2009 | Crooks ................. F16D 1/0876 198/779 |

(Continued)

FOREIGN PATENT DOCUMENTS

| CN | 109607061 A | 4/2019 |
| CN | 208932255 U | 6/2019 |

(Continued)

*Primary Examiner* — Kavel Singh
(74) *Attorney, Agent, or Firm* — Michael Soderman

(57) ABSTRACT

The invention relates to a chainwheel (1, 1') for transferring a drive output from an input shaft, more particularly from a drum motor (800), onto a synthetic modular belt (900), a drum motor (800) for driving a synthetic modular belt, a semi-finished chainwheel product (10) for a chainwheel (1, 1') and a method for producing a chainwheel (1, 1'). The chainwheel comprises at least one toothed ring and an outer ring (200, 200') and an inner ring (300, 300') adjoining the toothed ring, wherein the inner ring (300, 300') and the outer ring (200, 200') are connected to one another via bridges (410, 410').

6 Claims, 17 Drawing Sheets

(56) References Cited

U.S. PATENT DOCUMENTS

| | | | |
|---|---|---|---|
| 10,077,157 B2 * | 9/2018 | Soderstrom | B65G 23/06 |
| 2011/0094856 A1 | 4/2011 | Guldenfels et al. | |
| 2017/0073166 A1 | 3/2017 | Baking | |

FOREIGN PATENT DOCUMENTS

| | | |
|---|---|---|
| DE | 102007012522 A1 | 9/2008 |
| DE | 202010009082 U1 | 1/2012 |
| DE | 102012102778 A1 | 10/2013 |
| DE | 102014012650 A1 | 3/2015 |
| EP | 1126174 B1 | 5/2004 |
| GB | 1580540 A | 12/1980 |
| WO | 2011029521 A2 | 3/2011 |
| WO | 2018013316 A1 | 1/2018 |

* cited by examiner

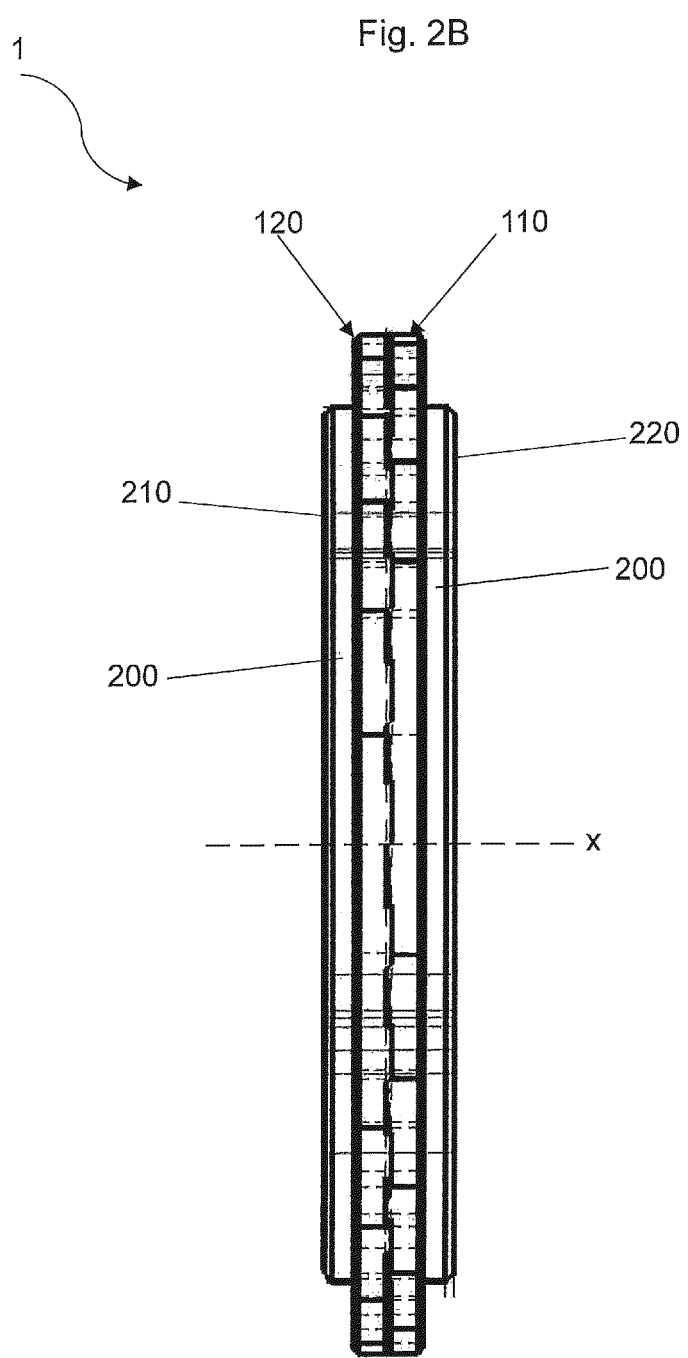

CHAINWHEEL, DRUM MOTOR, SEMI-FINISHED CHAINWHEEL PRODUCT AND METHOD FOR PRODUCING A CHAINWHEEL

CROSS REFERENCE TO RELATED APPLICATIONS

This application is the U.S. national stage of International Application No. PCT/EP2020/067223, filed on Jun. 19, 2020. The international application claims the priority of DE 102019117394.9 filed on Jun. 27, 2019; all applications are incorporated by reference herein in their entirety.

BACKGROUND

The invention relates to a sprocket for transferring a drive power from a drive shaft, in particular from a drum motor, to a plastic modular belt, to a drum motor for driving a plastic modular belt, to a semi-finished sprocket product of a sprocket and to a method for producing a sprocket.

By way of example, conveyor belts in the form of plastic modular belts are frequently used in the food industry. These are frequently used as endless conveyor belts in the food industry where contact is made with the product. These modular belts are often driven by means of drive shafts, for example in the form of drum motors. A drum motor is a compact, usually tubular drive unit in which the motor components are arranged within a shell that is usually cylindrical and that is also referred to as a drive drum. In order to transfer the drive power of a drive shaft, which may be designed for example in the form of a shell of a drum motor, sprockets made of high-grade steel may be arranged on the outer circumferential surfaces of drum motors, said sprockets in turn driving the modular belt.

Particularly in the food industry where there are higher hygiene requirements, but also in other areas of application, preference is given to low-wear and low-maintenance solutions which can be readily cleaned and reduce contaminants of the transport system and of the goods to be transported.

Sprockets for transferring a drive power from a drive shaft, in particular from a drum motor, to a plastic modular belt are generally made of high-grade steel and relative to their diameter have a high number of small teeth which are used to engage in corresponding cutouts in the modular belt in order to carry along the modular belt. By way of example, with regard to the requirements and construction possibilities, this area of application differs significantly from gears for gear pumps, as are known from EP 1 126 174 B1, which are used to convey and apply pressure to and compress liquids, such as for example motor oil in motor vehicle motors.

SUMMARY

It is therefore an object of the present invention to provide a sprocket for transferring a drive power from a drive shaft, in particular from a drum motor, to a plastic modular belt, a drum motor for driving a plastic modular belt, a semi-finished sprocket product of a sprocket and a method for producing a sprocket which are improved compared with existing solutions. In particular, it is an object of the present invention to provide a sprocket for transferring a drive power from a drive shaft, in particular from a drum motor, to a plastic modular belt, a drum motor for driving a plastic modular belt, a semi-finished sprocket product of a sprocket and a method for producing a sprocket which contribute to a low-wear and low-maintenance conveyor system which is particularly easy to clean and has a long service life and low noise emission.

This object is achieved according to a first aspect by a sprocket for transferring a drive power from a drive shaft, in particular from a drum motor, to a plastic modular belt, the sprocket comprising at least one toothed ring and an outer ring, which adjoins the toothed ring, and an inner ring, wherein the inner ring and the outer ring are connected to one another by means of webs.

DETAILED DESCRIPTION

In contrast to conventional sprockets made of high-grade steel, the sprocket described here has webs between an outer ring, which adjoins the toothed ring, and an inner ring which is used in particular for abutment against the drive shaft, for example in the form of the shell of a drum motor. The outer ring may also directly adjoin the inner ring, and the webs axially adjoin the inner ring from the outer ring.

A multiplicity of webs are preferably provided, which may for example be arranged so as to be distributed, in particular equidistantly, over the circumference.

In this way, the sprocket described here combines an in particular circumferential, outer toothed ring with a construction composed of outer ring, webs and inner ring and adjoining said outer toothed ring, which combines a stable and simultaneously weight- and cost-reduced construction with the advantages of a conventional toothed ring.

In the present description, indications such as axially, radially, in the circumferential direction, etc., relate in particular to an axis which runs through the center point of the sprocket and which preferably corresponds with a longitudinal axis of a drum motor in the mounted state.

According to a preferred embodiment, it is provided that the sprocket comprises at least two toothed rings, the teeth of which are preferably arranged offset relative to one another in the circumferential direction. As an alternative or in addition, the teeth of a toothed ring or of both toothed rings are preferably formed with tooth flanks of differing inclination. It is furthermore preferably provided that the outer ring radially inwardly and/or directly adjoins the toothed ring or the toothed rings, and/or the outer ring bears the toothed ring or the toothed rings.

The provision of at least two toothed rings, the teeth of which are arranged offset relative to one another in the circumferential direction, and/or the formation with tooth flanks of differing inclination in particular also permit/permits a reversing operation of the modular belts, i.e. an operation with forward and rearward running, that is to say an operation in which the transport direction can be reversed. To this end, tooth flanks of differing inclination are preferred, with the steeper tooth flank generally being arranged such that it serves as the surface for transmitting force to the modular belt. The tooth flanks of the one and/or of the two toothed rings are therefore preferably formed such that the steep tooth flanks of the one toothed ring or of the one set of teeth and the steep tooth flanks of the other toothed ring or of the other set of teeth are oriented toward one another, with the result that they are optimally oriented in each case for the forward or rearward running of the modular belt. The two toothed rings are preferably arranged so as to be axially adjacent to one another, in particular so as to be directly axially adjacent.

The tooth bases preferably merge directly into the outer ring such that the latter preferably radially inwardly and/or directly adjoins the toothed ring or the toothed rings. In particular, the outer ring bears the toothed ring or the toothed rings.

Furthermore, the inner ring is preferably spaced apart from the outer ring in a radial direction. As an alternative, it is preferable for the outer ring to directly adjoin the inner ring, in particular an outer circumferential surface of the inner ring, for example by the outer ring being injection-molded onto the inner ring.

Furthermore, it is preferable for the outer ring to partially enclose the inner ring in an axial direction. The outer ring preferably partially encloses the inner ring, in particular the opposite end faces thereof, from radially outside to radially inside, in particular over a part of the radial extent of the inner ring, in particular the opposite end faces thereof. Furthermore, it is preferable for the outer ring to extend partially along the inner ring, in particular the opposite end faces thereof, in the radial direction.

This is particularly advantageous since a relative movement between the inner ring and the outer ring in the axial direction may be prevented or reduced in this way.

Furthermore, it is preferable for the webs to extend in the radial direction, in particular from the outer ring to the inner ring or vice versa.

Furthermore, the webs preferably directly adjoin the inner ring, in particular an end face of the inner ring or opposite end faces of the inner ring, in the axial direction. The webs are preferably situated opposite one another in each case in pairwise fashion on the opposite end faces of the inner ring. A form fit, in particular in the form of a butt-joint connection, between the webs and the inner ring is preferably brought about by the webs directly adjoining the inner ring in the axial direction. Since the webs are furthermore preferably connected to the outer ring (and in particular formed in one piece with the outer ring and/or produced together with the outer ring in an injection-molding process, as is also described), there is thus preferably a connection of the outer ring to the inner ring by means of the webs.

Furthermore, the webs are preferably spaced apart from one another in the circumferential direction, in particular spaced apart in an equidistant manner. The two webs of a pair, which are arranged on opposite end faces of the inner ring, are preferably arranged at the same circumferential position, wherein the pairs are preferably spaced apart from one another in the circumferential direction, in particular spaced apart in an equidistant manner.

The opposite end faces of the inner ring may also be referred to as the first and second end faces of the inner ring.

Furthermore, individual, multiple or all webs preferably extend over the total radial extent of the inner ring in the radial direction. Individual, multiple or all webs may extend only over a part of the radial extent of the inner ring in the radial direction. In particular, it may be preferable for the two webs of a pair to have a different radial extent. For instance, it may in particular be preferable for individual, multiple or all webs which adjoin the first end face of the inner ring to extend over the total radial extent of the inner ring, and for individual, multiple or all webs which adjoin the second end face of the inner ring to extend only over a part of the radial extent of the inner ring.

The webs, in particular the pairs of webs, are preferably arranged between the projections of the inner ring, which are to be described in more detail, in the circumferential direction.

Furthermore, the webs preferably taper in the radial direction from the outside inward.

Cavities are preferably formed between the webs. In this case, it may be preferable for at least one intermediate disk to be provided which extends between the outer ring and the inner ring and preferably connects the outer ring and the inner ring and the webs to one another. In this way, provision is made of a material- and cost-saving construction which is simultaneously stable and entails production advantages.

Particularly when sprockets are being formed from plastic, in particular in an injection-molding process, a configuration with thin-walled profiles is preferred in order to obtain the highest possible accuracy of fit of the finished parts and to avoid warpage which may otherwise occur for example during cooling in the casting process.

In a further embodiment, it is preferable for the inner ring to have a cutout for receiving a parallel key which is preferably arranged on the drive shaft. Furthermore, it is preferably provided that the inner ring has projections, in particular exactly three projections, for abutment against the drive shaft, wherein the projections preferably protrude radially inward, and/or wherein the cutout for receiving the parallel key is preferably arranged on one of the projections, and/or wherein the cutout and/or the projections preferably extend over the total axial length of the inner ring.

Preference is given to connecting a sprocket to the drive shaft by means of a parallel key, which is received in a cutout, in order to ensure reliable and exact positioning of the sprocket on the drive shaft.

Preference is given to forming projections on the inner ring in order to ensure a good fit of the sprocket on the drive shaft, in particular in the case of a three-point mounting by means of exactly three projections.

These projections result in a further advantage in that a distance between the inner ring and the drive shaft remains in the rest of the regions of the inner ring between the projections. It is for example possible for cleaning fluids to pass through this distance when the transport system is being cleaned and to thus improve a thorough and comprehensive cleaning of the transport system.

Furthermore, the mounting of the sprockets on the drive shaft is made easier by the projections, since the regions of relatively large diameter between the projections have the effect of reducing tilting of the sprockets on the drive shaft. At the same time, the projections can be produced with a very high accuracy of fit with respect to the drive shaft.

In this case, it is particularly preferable for the production process to involve subsequent treatment of the projections, in particular of the radially internal side, for example by milling. This makes it possible to achieve a particularly high accuracy of fit of the projections with respect to the drum motor shell.

In a further embodiment, it is preferable for the inner ring to have an outer circumferential surface, wherein the outer circumferential surface of the inner ring preferably deviates from a cylindrical shape. By way of example, the outer circumferential surface of the inner ring may have one or more projections which are in particular spaced apart in the circumferential direction and/or one or more indentations which are in particular spaced apart in the circumferential direction. The outer circumferential surface of the inner ring may preferably have one or more steps which are in particular spaced apart in the circumferential direction and/or at least two or more portions which are in particular spaced apart in the circumferential direction and which have different radii. Particular preference is given to a non-cylindrical configuration of the outer circumferential surface of the inner ring if the outer ring, in particular an inner circumferential surface of the outer ring, directly adjoins the inner ring, in particular the outer circumferential surface of the inner ring. This is for example the case if the outer ring—preferably together with the webs and/or the toothed ring or the toothed rings—is injection-molded onto the inner ring, which may be composed of metal or comprise metal, for example. A non-cylindrical configuration of the outer circumferential surface of the inner ring may advantageously contribute to preventing or reducing a relative movement between the inner ring and the outer ring in the circumferential direction.

As an alternative or in addition, it is preferable for the first and/or the second end face of the inner ring to deviate from a planar surface. By way of example, the first and/or the second end face of the inner ring may have one or more projections which are in particular spaced apart in the circumferential direction and/or one or more indentations which are in particular spaced apart in the circumferential direction. The first and/or the second end face of the inner ring may preferably have one or more steps which are in particular spaced apart in the circumferential direction and/or at least two or more portions which are in particular spaced apart in the circumferential direction and which have different axial extents. The configuration of the first and/or second end face of the inner ring, said configuration deviating from a planar surface, preferably engages with individual, multiple or all webs. A non-planar configuration of the first and/or second end face of the inner ring, in particular if this engages with the webs, is particularly preferred to prevent or reduce a relative movement between the inner ring and the outer ring in the circumferential direction.

In a further embodiment, it is preferable for the outer ring to have, on its first end face, a first shoulder which preferably projects beyond the first end face in the axial direction, and/or the outer ring to have, on its second end face, a second shoulder which preferably projects beyond the second end face in the axial direction. In a further preferred embodiment, it is provided that a first end face of the inner ring forms a first shoulder, and/or a second end face of the inner ring forms a second shoulder.

Furthermore, it is preferably provided that an axial extent from the first shoulder to the second shoulder of the outer ring corresponds to an axial extent from the first shoulder to the second shoulder of the inner ring.

Furthermore, it is preferably provided that an axial extent from the first shoulder to the second shoulder of the outer ring is greater than an axial extent of the at least one toothed ring, preferably is greater than an axial extent of two toothed rings, and/or an axial extent from the first shoulder to the second shoulder of the inner ring is greater than an axial extent of the at least one toothed ring, preferably is greater than an axial extent of two toothed rings.

Furthermore, it is preferably provided that an axial extent from the first shoulder to the second shoulder of the outer ring is greater than an axial extent of the webs. It is furthermore preferably provided that an axial extent from the first shoulder to the second shoulder of the inner ring is greater than an axial extent of the webs. It is furthermore preferably provided that an axial extent from the first shoulder to the second shoulder of the outer ring is greater than an axial extent of the intermediate disk. It is furthermore preferably provided that an axial extent from the first shoulder to the second shoulder of the inner ring is greater than an axial extent of the intermediate disk. It is furthermore preferably provided that an axial extent of the webs is greater than an axial extent of the intermediate disk.

The embodiments described here have inter alia the advantage, in particular compared with existing sprockets for example made of high-grade steel, that a greater axial extent of the sprocket, in particular of the inner ring, is made possible with a simultaneously thin-walled but stable and exactly fitting configuration of the sprocket.

An enlarged axial extent of the sprocket, in particular of the inner ring, allows an improved fit of the sprockets on the drive shaft. This makes it possible, in particular, to reduce noise emissions which occur in the case of conventional sprockets made of high-grade steel. These sprockets are generally of disk-like form and have only a very small axial extent, and therefore deviate slightly from an exact radial orientation, resulting in the production of noise emissions. Furthermore, sprockets having a relatively great axial extent are more stable in terms of their tilting behavior, as a result of which a stable fit on the drive shaft is achieved. In this way, it is also possible to reduce both so-called walking of the sprockets on the drive shaft and increased wear on the plastic modular belt.

A further preferred embodiment is characterized by a first, in particular annular-disk-shaped, cover disk which preferably extends from the first shoulder of the outer ring to the first shoulder of the inner ring and/or is preferably fastened to the first shoulder of the outer ring and/or the first shoulder of the inner ring, in particular is fastened in a fluid-tight and/or materially bonded manner and/or by way of a welded connection. A further preferred refinement is characterized by a second, in particular annular-disk-shaped, cover disk which preferably extends from the second shoulder of the outer ring to the second shoulder of the inner ring and/or is preferably fastened to the second shoulder of the outer ring and/or the second shoulder of the inner ring, in particular is fastened in a fluid-tight and/or materially bonded manner and/or by way of a welded connection.

The provision of cover disks on the two end faces of the sprocket has the advantage that a closed outer surface of the sprocket can be formed, which is advantageous in particular for meeting high hygiene requirements, such as for example in the food sector. Particular preference is given to a fluid-tight connection between the first and the second cover disk, respectively, and the first shoulders of the outer ring and of the inner ring and the second shoulders of the outer ring and inner ring, respectively, preferably realized by means of a welded connection, in particular ultrasonic welding. In this way, no fluids can penetrate into the cavities between the webs. In particular, it is thus possible to create a sprocket which—apart from the tooth geometry required for engagement with the modular belt and the cutout and the projections on the radial inner surface of the inner ring—has a substantially closed, preferably smooth, outer surface, in particular on the two end faces of the sprocket. This makes cleaning easier and prevents or reduces the deposition of contaminants.

In a further preferred configuration, it is provided that the outer ring is of circular form and/or the first shoulder of the outer ring is of circular form and/or the second shoulder of the outer ring is of circular form. It is furthermore preferably provided that an outer circumference of the first cover disk is of circular form and/or an outer circumference of the second cover disk is of circular form. It is furthermore preferably provided that an inner circumference of the first cover disk has a cutout for a parallel key and/or an inner circumference of the first cover disk has projections, in particular exactly three projections, for abutment against the drive shaft, wherein the projections preferably protrude radially inward, and/or wherein the cutout for receiving the parallel key is preferably arranged on one of the projections, and/or an inner circumference of the second cover disk has a cutout for a parallel key and/or an inner circumference of the second cover disk has projections, in particular exactly three projections, for abutment against the drive shaft, wherein the projections preferably protrude radially inward, and/or wherein the cutout for receiving the parallel key is preferably arranged on one of the projections.

With these configurations, it is advantageously provided that the first and second cover disks correspond substantially to the contours of the first and second shoulders of the outer ring and of the first and second shoulders of the inner ring.

A connection between the first and second cover disk, respectively, and the first and second shoulders of the outer ring and the first and second shoulders of the inner ring is preferably effected by means of the end-face surfaces of the first and second shoulders of the outer ring and of the first and second shoulders of the inner ring, and also of the corresponding surfaces of the first and second cover disk that are close to the edge.

In a further preferred embodiment, it is provided that the toothed ring or the toothed rings and/or the outer ring and/or the inner ring and/or the webs and/or the intermediate disk and/or the first cover disk and/or the second cover disk are composed of solid material, in particular plastic.

Furthermore, it is preferably provided that the toothed ring or the toothed rings and/or the outer ring and/or the inner ring and/or the webs and/or the intermediate disk and/or the first cover disk and/or the second cover disk are produced in an injection-molding process, wherein the toothed ring or the toothed rings and the outer ring and the inner ring and the webs and the intermediate disk are preferably produced in a single, common injection-molding step. It is furthermore preferably provided that the cavities between the webs are free from filling material.

Particular preference is given to forming the sprocket, preferably completely, from plastic. Here, the preferred plastics used are in particular technopolymers, in particular thermoplastics. Particular preference is given to plastics approved for the food sector, such as for example polyoxymethylene, in particular polyoxymethylene copolymer (POM-C).

The formation in particular of the toothed ring or of the toothed rings from plastic has the advantage that there is a considerably lower level of wear on the plastic modular belt compared with the use of sprockets made of high-grade steel with toothed rings made of high-grade steel. Particularly in areas of application with high hygiene requirements, such as for example the food sector, this is highly advantageous for preventing or at least reducing contamination of the transport system and also especially of the goods to be transported.

In particular, it is preferable for the toothed ring or the toothed rings and the outer ring and the inner ring and the webs and the intermediate disk and the first cover disk and the second cover disk to be produced from the same material. Furthermore, it is in particular preferable for all constituent parts of the sprocket—except for the first and second cover disks—to be produced as a one-piece component in a single, common production step, in particular in an injection-molding process. The first and second cover disks, which are preferably composed of the same material, are then connected in each case preferably in a materially bonded manner, in particular by ultrasonic welding, to the first and second shoulders, respectively, of the inner ring and of the outer ring, such that overall an integral component made of one material is produced. In this case, the cavities between the webs preferably remain free from filling material.

While a lightweight, thin-walled and simultaneously stable and outwardly closed support structure is thus produced between the inner ring and the outer ring, possibly together with the intermediate disk, and the webs and the cavities arranged therebetween which are covered by the cover disks, an advantageous overall structure is created as a result of the formation of the toothed ring or of toothed rings and of the outer ring from solid material. In the case of the latter, the toothed ring or the toothed rings and the outer ring are manufactured from solid material. Since the tooth geometry required for engagement in a modular belt and for driving thereof makes provision for small teeth in comparison to the total diameter of the sprocket, the risk of warpage occurring here during production, in particular during cooling, is low.

The radial extent of the outer ring is preferably smaller, in particular several times smaller, than the radial distance between the outer ring and the inner ring. Furthermore, it is preferable for the radial extent of the inner ring to be smaller, in particular several times smaller, than the radial distance between the outer ring and the inner ring.

In a further particularly preferred embodiment, it is provided that the toothed ring or the toothed rings and/or the outer ring and/or the inner ring and/or the webs and/or the intermediate disk and/or the first cover disk and/or the second cover disk are composed of solid material, in particular metal, preferably high-grade steel. The toothed ring or the toothed rings and/or the outer ring and/or the webs and/or the intermediate disk and/or the first cover disk and/or the second cover disk are preferably composed of plastic and/or comprise plastic. The inner ring is preferably composed of metal, preferably high-grade steel, and/or comprises metal, preferably high-grade steel.

It is furthermore preferable for the toothed ring or the toothed rings and/or the outer ring and/or the webs and/or the intermediate disk and/or the first cover disk and/or the second cover disk to be produced in an injection-molding process, wherein the toothed ring or the toothed rings and the outer ring and the webs are preferably produced in a single, common injection-molding step, and/or wherein the toothed ring or the toothed rings and the outer ring and the webs are preferably injection-molded onto the inner ring.

The formation of the inner ring from metal, preferably high-grade steel, has the advantage that an increased stability and/or an improved transmission of force from the drive shaft to the sprocket can be obtained. At the same time, the formation of the outer ring and of the toothed ring or of the toothed rings, preferably also of the webs, from plastic achieves the above-described advantage in relation to the use with plastic modular belts.

The inner ring is preferably composed of solid material, and is preferably produced by providing a rolled sheet metal, in particular high-grade sheet steel, in a desired thickness, which preferably corresponds to the axial extent of the inner ring, and/or laser cutting the inner ring from the sheet metal.

The sprocket, in particular the inner ring, preferably has an axial extent of at least 5 mm, preferably of at least 7.5 mm, in particular of at least 8 mm. In particular, it is preferable for the inner ring to have an axial extent of at least 4%, preferably of at least 5%, of at least 7.5%, or of at least 9%, of a diameter, in particular of an inner diameter and/or of an outer diameter, of the sprocket. The inner ring preferably has an axial extent of at most 25%, preferably of at most 20%, of at most 15%, or of at most 10%, of a diameter, in particular of an inner diameter and/or of an outer diameter, of the sprocket. It is particularly preferable for the inner ring to have an axial extent between 4 and 9% of a diameter, in particular of an inner diameter and/or of an outer diameter, of the sprocket.

This allows an improved fit of the sprockets on the drive shaft, as a result of which it is in particular possible to reduce noise emissions, in particular also compared with conventional sprockets made of high-grade steel which are of disk-like form and thus have only a very small axial extent. Furthermore, the greater axial extent makes it possible to achieve a stable fit on the drive shaft with a reduced tendency to tilt, as a result of which it is possible to reduce both so-called walking of the sprockets on the drive shaft and increased wear on the plastic modular belt.

According to a further aspect, the object is achieved by a drum motor for driving a plastic modular belt, characterized in that two, three or more sprockets as described above are arranged, preferably axially spaced apart from one another, on the drum motor, in particular on its lateral surface which forms a drive shaft. The sprockets are preferably spaced apart from one another in an equidistant manner.

According to a further aspect, the object is achieved by a semi-finished sprocket product of an above-described sprocket, characterized in that the semi-finished sprocket product has, proceeding from a center point, production webs, in particular exactly three production webs, which preferably connect an injection point corresponding in particular to the center point, and/or two or more injection points assigned in each case to one or more production webs, to the inner ring and/or to the webs.

According to a further aspect, the object mentioned in the introduction is achieved by a method for producing an above-described sprocket, the method comprising forming at least one toothed ring and an outer ring, which adjoins the toothed ring, and an inner ring, wherein the inner ring and the outer ring are connected to one another by means of webs.

The method also preferably comprises
forming a first, in particular annular-disk-shaped, cover disk which preferably extends from the first shoulder of the outer ring to the first shoulder of the inner ring, and/or
fastening the first cover disk to the first shoulder of the outer ring and/or the first shoulder of the inner ring, in particular in a fluid-tight and/or materially bonded manner and/or by way of a welded connection.

The method also preferably comprises
forming a second, in particular annular-disk-shaped, cover disk which preferably extends from the second shoulder of the outer ring to the second shoulder of the inner ring, and/or
fastening the second cover disk to the second shoulder of the outer ring and/or the second shoulder of the inner ring, in particular in a fluid-tight and/or materially bonded manner and/or by way of a welded connection.

Furthermore, it is preferable for the method to be characterized in that the toothed ring or the toothed rings and/or the outer ring and/or the inner ring and/or the webs and/or the intermediate disk and/or the first cover disk and/or the second cover disk are produced from solid material, in particular plastic or metal, wherein the toothed ring or the toothed rings and/or the outer ring and/or the webs and/or the intermediate disk and/or the first cover disk and/or the second cover disk preferably are or have been produced from and/or with plastic, and/or wherein the inner ring preferably is or has been produced from and/or with metal, and/or for the method to be characterized in that the toothed ring or the toothed rings and/or the outer ring and/or the inner ring and/or the webs and/or the intermediate disk and/or the first cover disk and/or the second cover disk are produced in an injection-molding process, wherein the toothed ring or the toothed rings and the outer ring and the inner ring and the webs and the intermediate disk are preferably produced in a single, common injection-molding step, and/or in that the toothed ring or the toothed rings and/or the outer ring and/or the webs and/or the intermediate disk and/or the first cover disk and/or the second cover disk are or have been produced in an injection-molding process, wherein the toothed ring or the toothed rings and the outer ring and the webs preferably are or have been produced in a single, common injection-molding step, and/or wherein the toothed ring or the toothed rings and the outer ring and the webs preferably are or have been injection-molded onto the inner ring, and/or a semi-finished sprocket product is initially produced which has, proceeding from a center point, production webs, in particular exactly three production webs, which preferably connect an injection point corresponding in particular to the center point, and/or two or more injection points assigned in each case to one or more production webs, to the inner ring and/or the webs.

Furthermore, it is preferable for the method to comprise removing the production webs.

The order of the method steps mentioned here and in the claims is not mandatory, and a different order of the method steps is possible.

The provision of production webs, in particular exactly three production webs, which, proceeding from a center point, connect the injection point to the inner ring and/or to the webs, simplifies the production of the sprocket in the injection-molding process and improves the quality of the resultant sprocket. In particular, the combination of the production webs with the configuration of the webs and preferably of the intermediate disk makes it possible to ensure a continuous flow of material from the injection point via the inner ring, the intermediate disk, the webs and the outer ring to the tooth tips of the toothed rings. When exactly three production webs are provided, there are substantially also exactly three injection fronts, which can be taken into account in the design of the sprocket and of the injection-molding process. By virtue of the fact that the webs, the outer ring and the inner ring are preferably additionally connected by means of the intermediate disk, the material can spread out in a rapid and comprehensive manner such that the development of uncontrolled injection fronts can be largely prevented. Rapid spreading of the material in the injection-molding process and the formation merely of small elements such as the toothed ring and the outer ring from solid material and the provision of thin-walled elements in the rest of the sprocket also has the advantage that rapid cooling can be effected, without the occurrence of warpage which would have an adverse effect on the accuracy of fit. In this way, the cycle times for producing such sprockets are low, which reduces the production costs considerably.

When the inner ring is being formed from and/or with metal, the provision of production webs, in particular exactly three production webs, which, proceeding from a center point, connect the injection point to the webs, has the advantage that the inner ring can be overmolded from an injection point.

As an alternative or in addition, two or more injection points may be provided, which are assigned in each case to one or more production webs. In this way, individual, multiple or all production webs can be supplied by separate injection points.

It is also preferable for individual, multiple or all webs, in particular individual, multiple or all webs on the first end face of the inner ring, to extend in the axial direction at least over the entire extent of the inner ring and then preferably merge into the production webs.

With regard to the advantages, design variants and design details of these further aspects of the invention and the developments thereof, reference is also made to the above description relating to the corresponding features of the sprocket.

BRIEF DESCRIPTION OF THE DRAWINGS

Preferred exemplary embodiments are described by way of example on the basis of the appended figures, in which:

FIG. 2B shows a side view of the sprocket as per FIG. 2A;

In the figures, identical or substantially functionally identical elements are denoted by the same reference designations. General descriptions relate as a rule to all embodiments insofar as differences are not explicitly specified.

DETAILED DESCRIPTION OF THE PREFERRED EMBODIMENTS

Figure 8A:
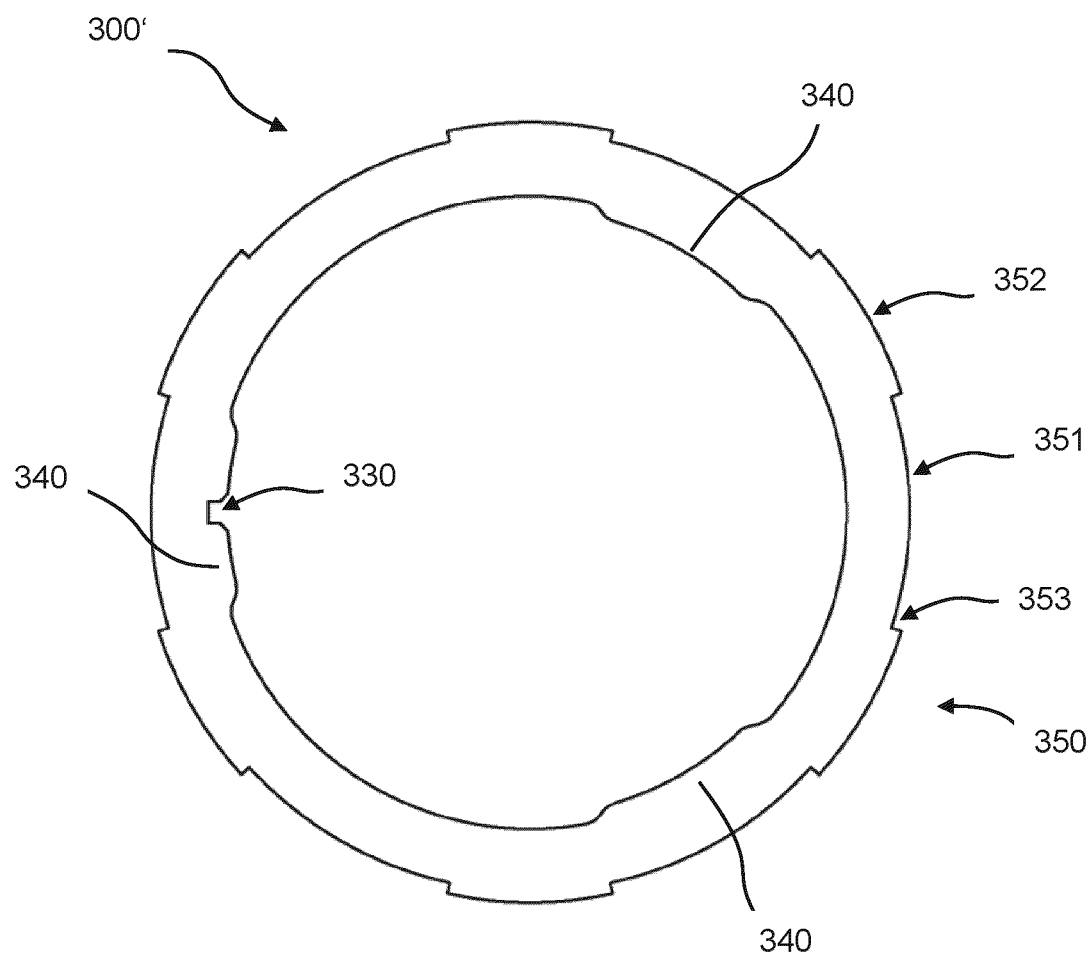
FIG. 8A shows a plan view of an exemplary embodiment of an inner ring for a sprocket as per FIGS. 6A and/or 7A.
Figure 8B:
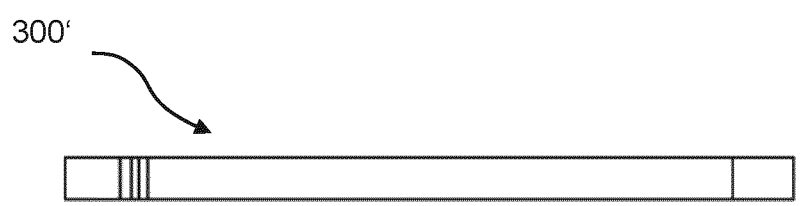
FIG. 8B shows a side view of the inner ring as per FIG. 8A.
Figure 9A:
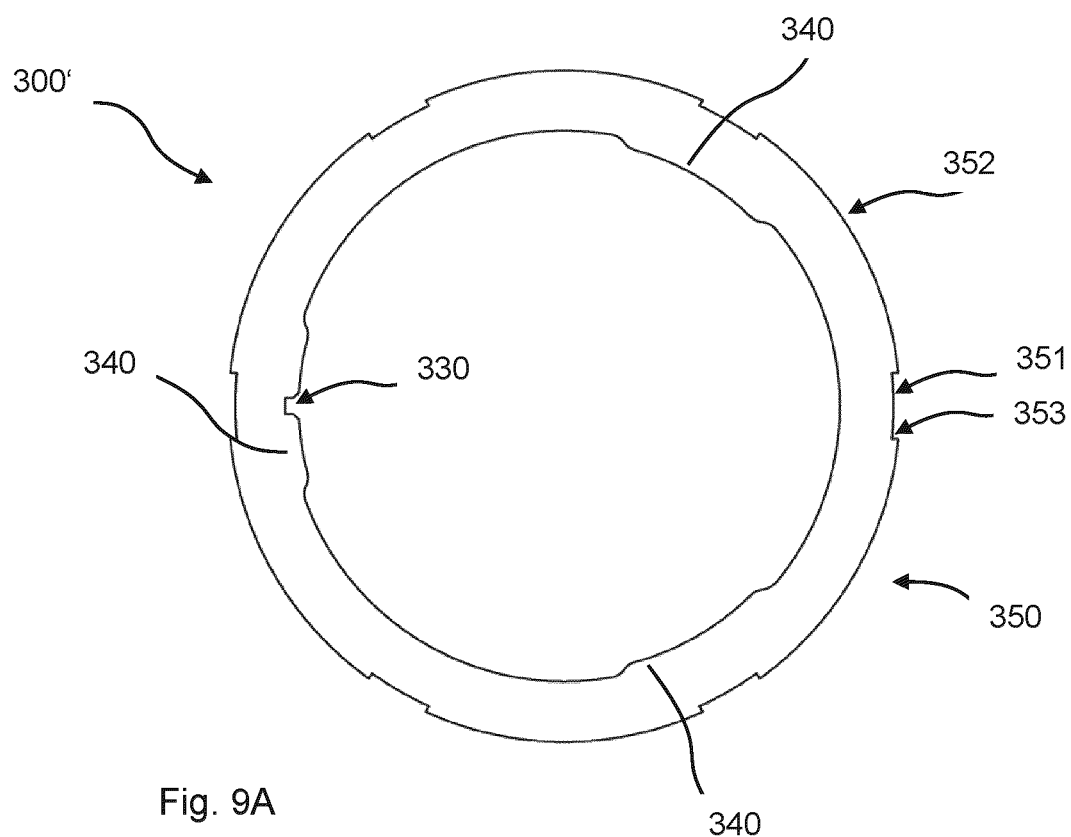
FIG. 9A shows a plan view of a further exemplary embodiment of an inner ring for a sprocket.
Figure 9B:
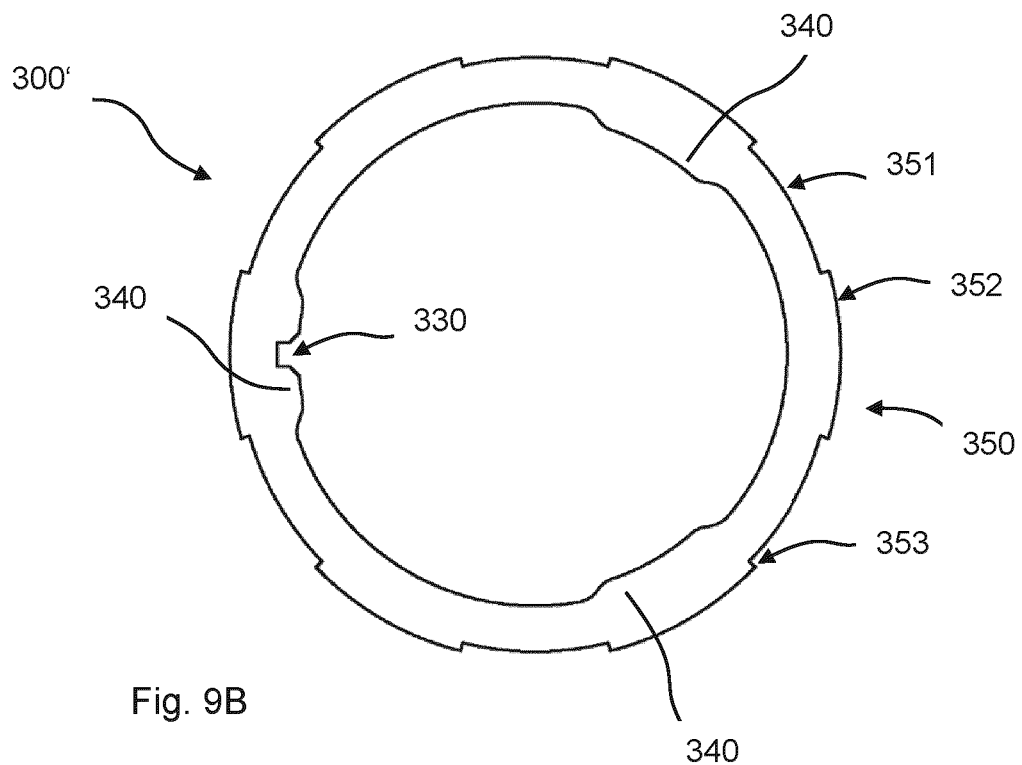
FIG. 9B shows a plan view of a further exemplary embodiment of an inner ring for a sprocket.

The sprockets illustrated in the figures differ in particular by the following configuration details. According to the sprocket of FIGS. 1A to C, the webs 410 have reinforcing points 411 in an approximately radially central manner. The sprocket 1 as per FIGS. 1A to C also does not have an intermediate disk. The sprocket 1 as per FIGS. 2A to D has not just one cutout 330 for receiving a parallel key 820 but three such cutouts 330 which are all arranged centrally in a projection 340 of the inner ring 300. FIGS. 6A to E and 7A to E illustrate further embodiments of sprockets 1' in which the inner ring 300' is composed of high-grade steel and has an outer ring 200' with webs 410' molded thereon. The inner ring 300' is also illustrated separately in FIGS. 8A, B. FIGS. 9A, B likewise show inner rings 300' made of high-grade steel with a slightly amended geometry for different diameters of sprockets 1'.

Figure 4:
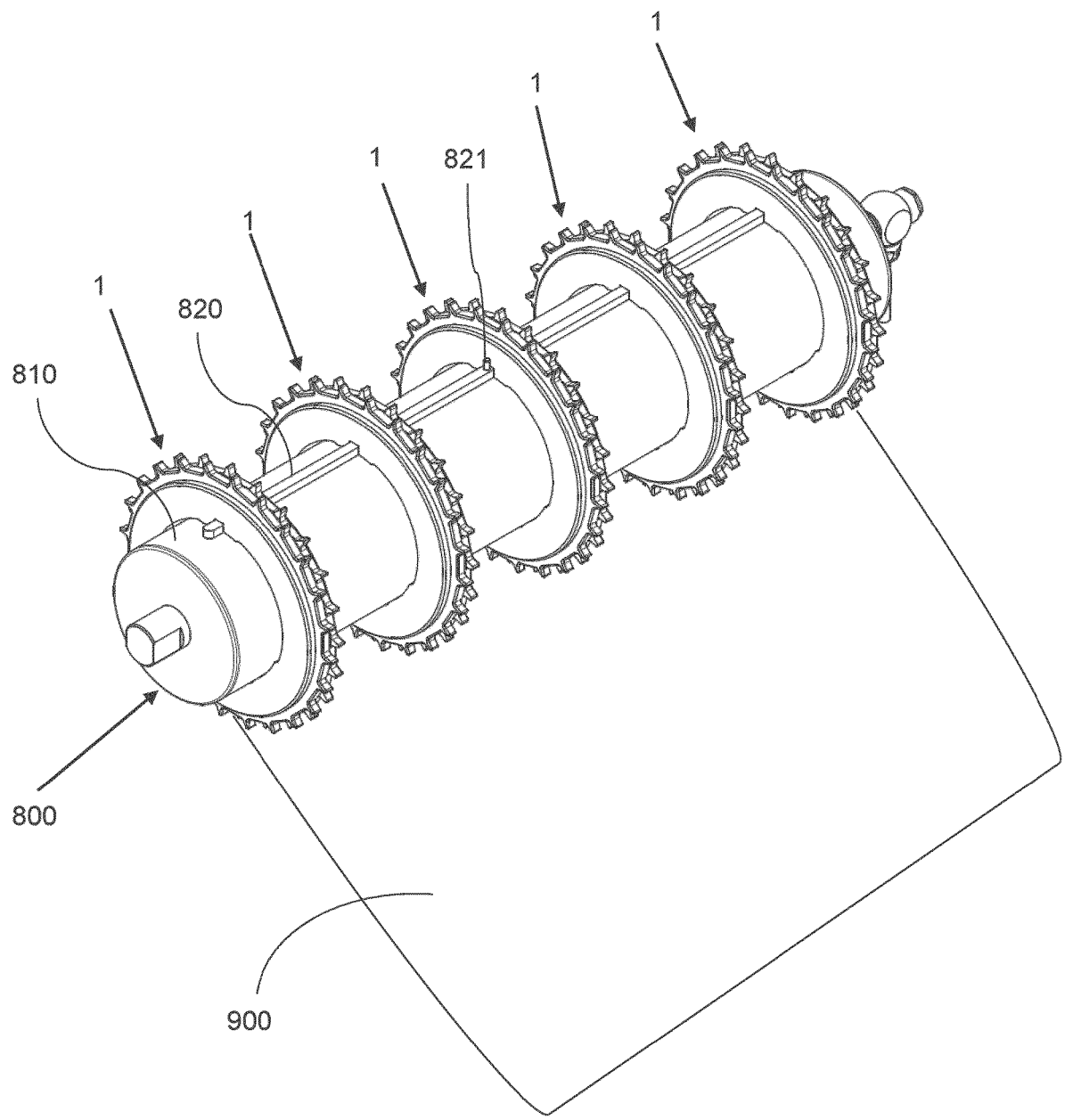
FIG. 4 shows a three-dimensional illustration of the exemplary embodiment of a drum motor with a plurality of sprockets and a plastic modular belt.
Figure 5:
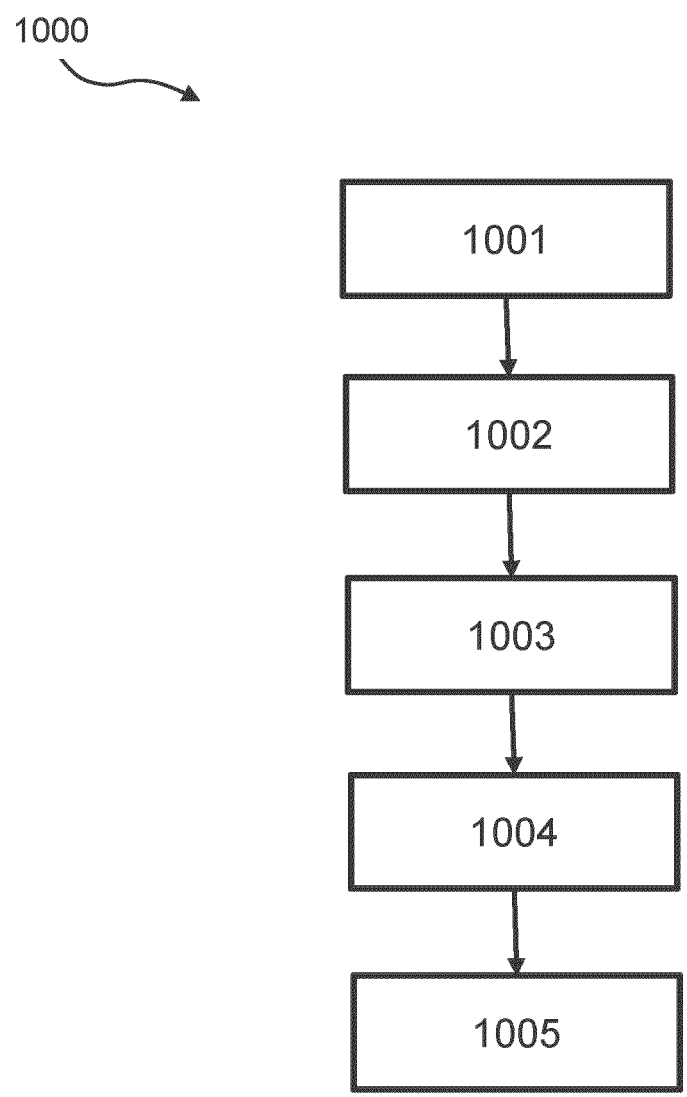
FIG. 5 shows a schematic flow diagram of an exemplary embodiment of a method for producing a sprocket.
Figure 6A:
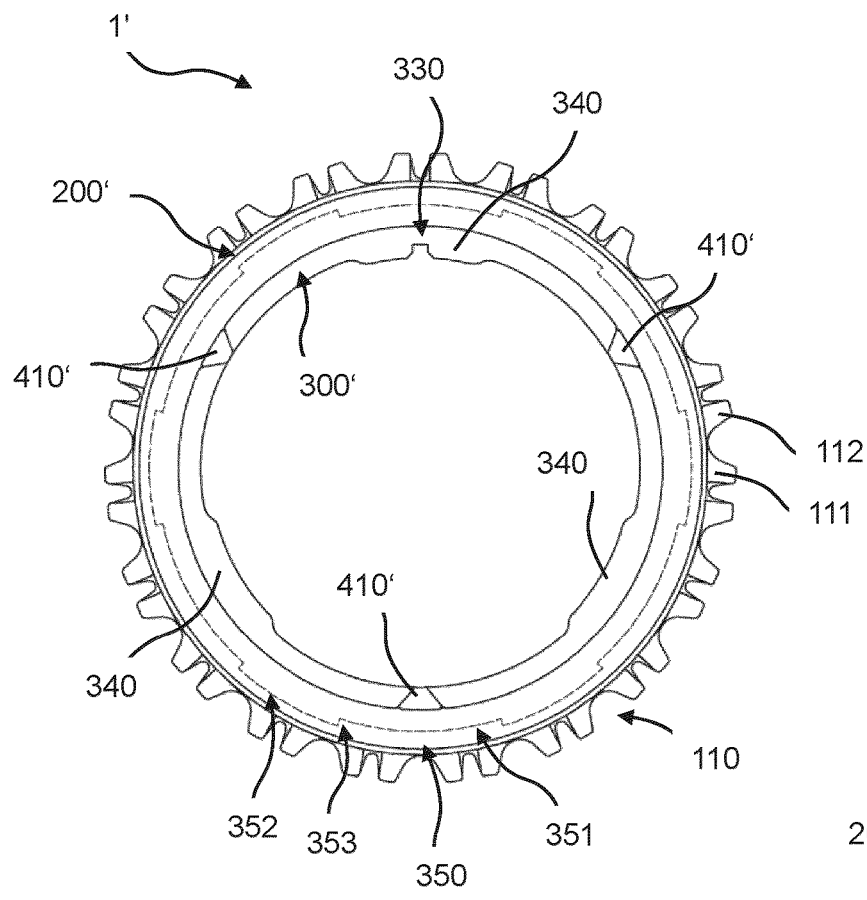
FIG. 6A shows a plan view of a further exemplary embodiment of a sprocket.
Figure 6B:
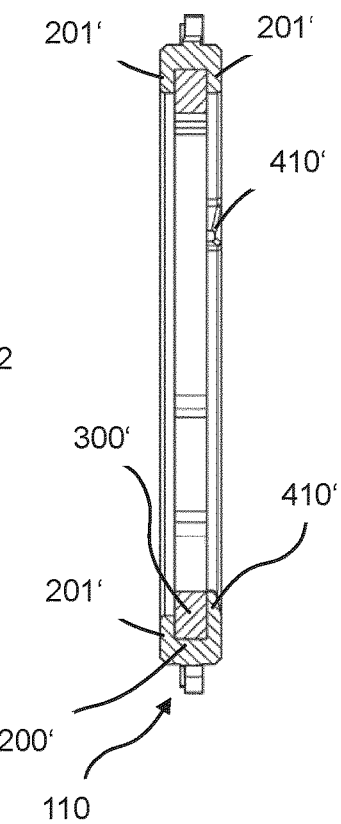
FIG. 6B shows a sectional illustration of the sprocket as per FIG. 6A.
Figure 6C:
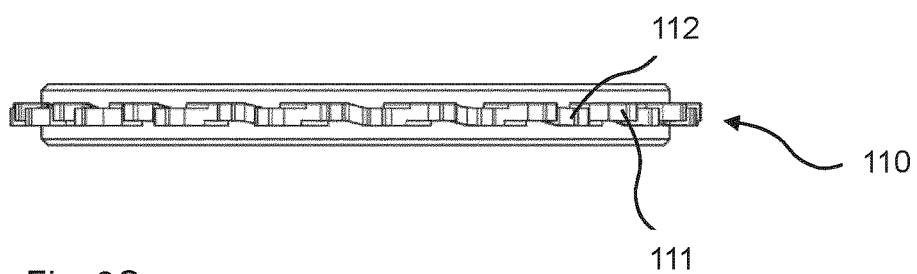
FIG. 6C shows a side view of the sprocket as per FIG. 6A.
Figure 6D:
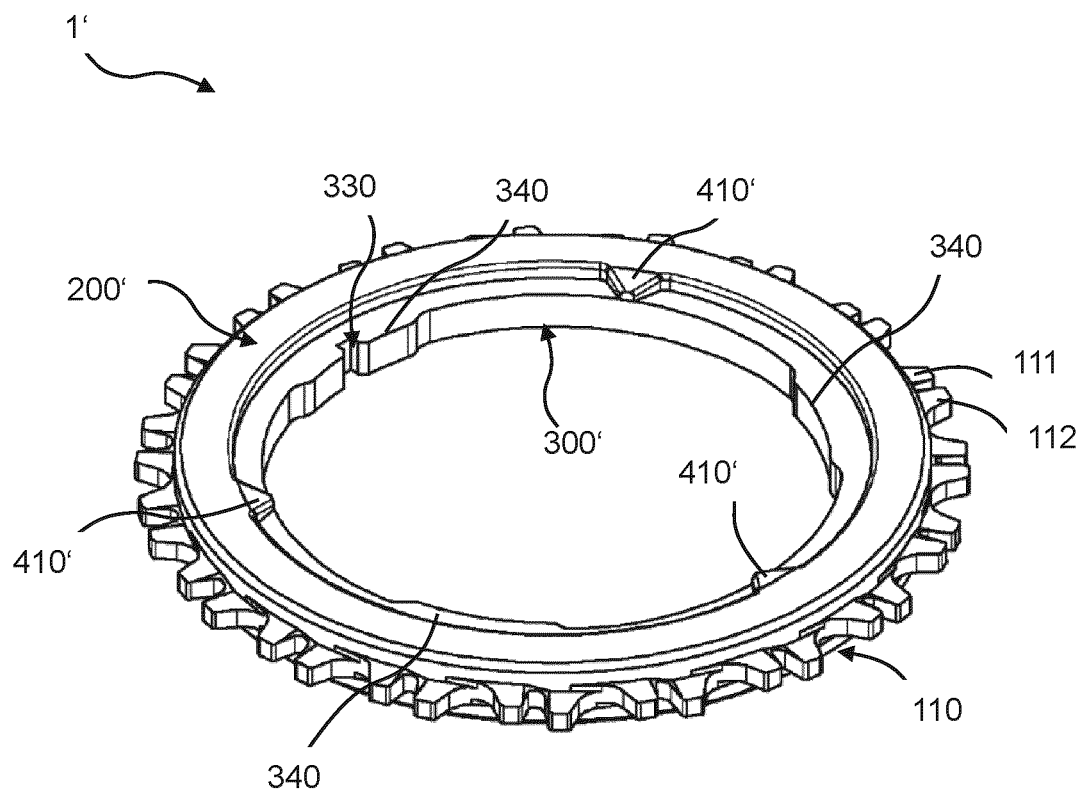
FIG. 6D shows a three-dimensional view of the sprocket as per FIG. 6A.
Figure 6E:
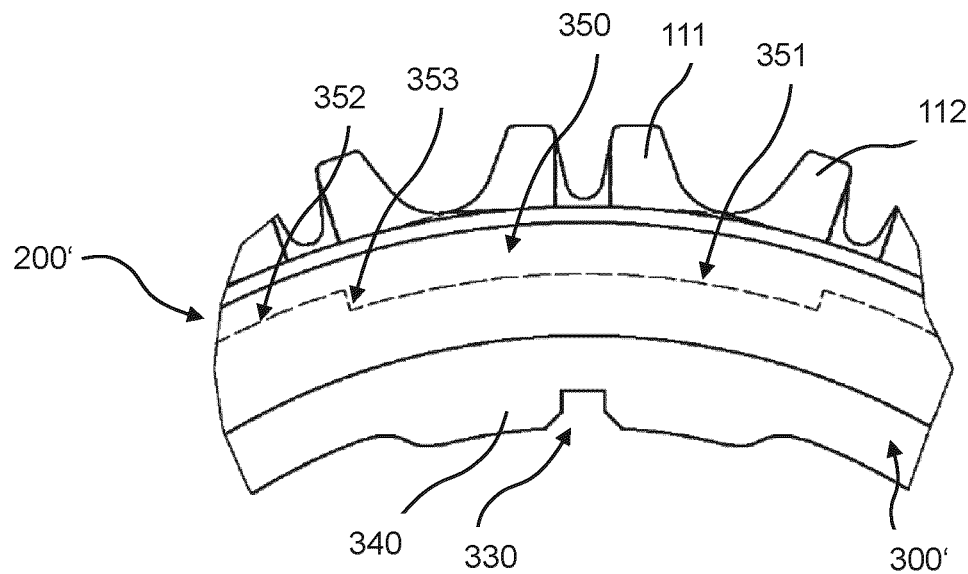
FIG. 6E shows an enlarged section of the sprocket as per FIG. 6A.
Figure 7A:
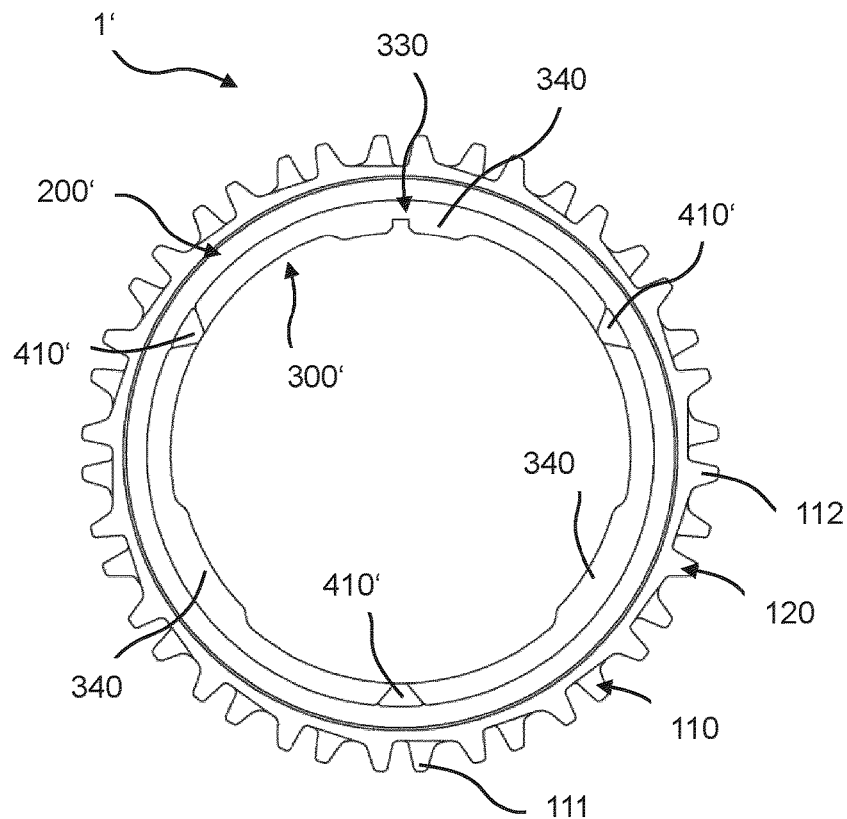
FIG. 7A shows a plan view of a further exemplary embodiment of a sprocket.
Figure 7B:
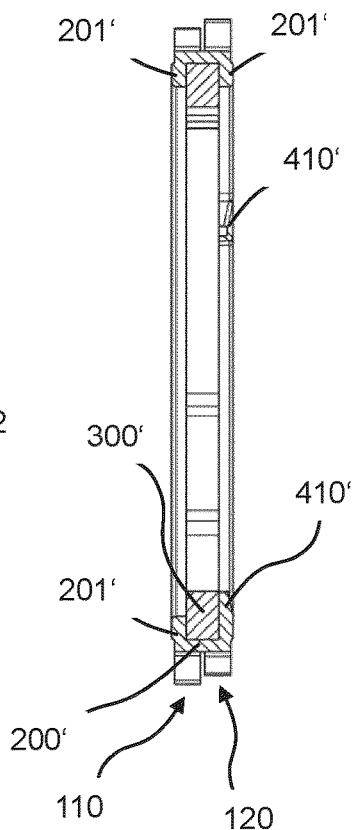
FIG. 7B shows a sectional illustration of the sprocket as per FIG. 7A.
Figure 7C:
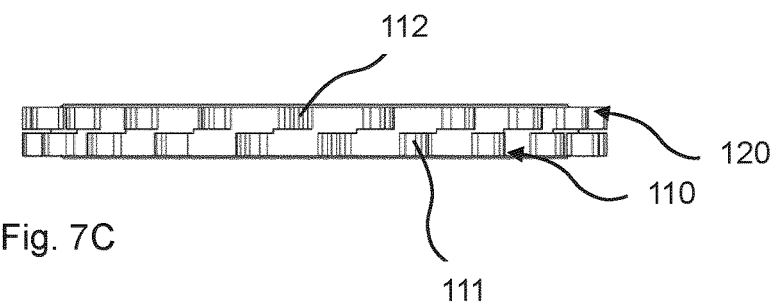
FIG. 7C shows a side view of the sprocket as per FIG. 7A.
Figure 7D:
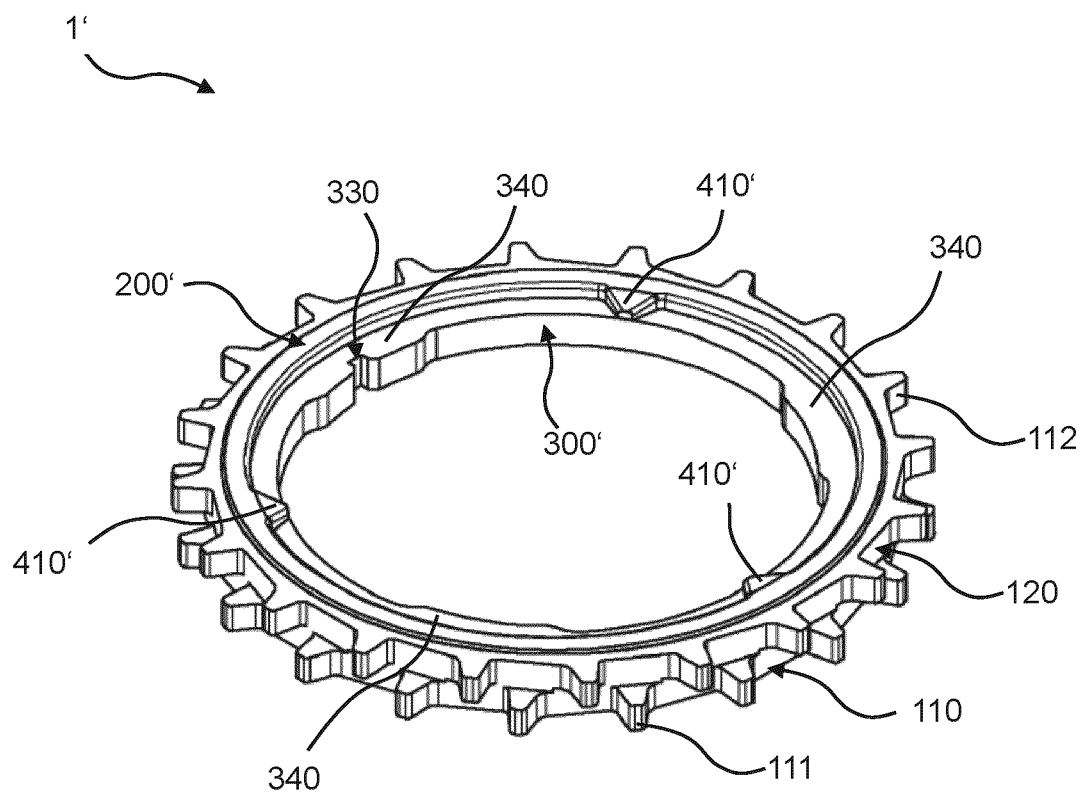
FIG. 7D shows a three-dimensional view of the sprocket as per FIG. 7A.
Figure 7E:
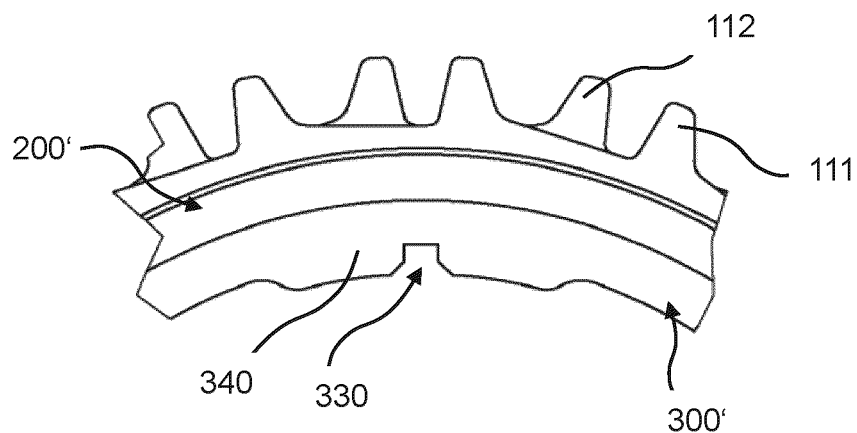
FIG. 7E shows an enlarged section of the sprocket as per FIG. 7A.

FIG. 4 shows a drum motor 800 having a lateral surface 810 which forms a drive shaft, and also having a parallel key 820. Arranged on the lateral surface 810 are five sprockets 1 by means of which the drive power is transferred from the drum motor 800 to a plastic modular belt 900 (which is indicated merely schematically in FIG. 4). The middle one of the five sprockets 1 is axially fixed to the parallel key 820 in both directions by fixing pins 821 (only one of the two fixing pins is visible in FIG. 4). The remaining four sprockets 1 are mounted in a floating manner in the axial direction.

FIGS. 1A to 3B show a sprocket 1 for transferring a drive power from a drive shaft, in particular from a drum motor 800, as illustrated for example in FIG. 4, to a plastic modular belt 900, which is also indicated schematically in FIG. 4.

The sprocket 1 comprises two toothed rings 110, 120 and an outer ring 200 which adjoins the toothed rings 110, 120. The outer ring 200 has, on its first end face, a first shoulder 210 which projects beyond the first end face in the axial direction. Equally, the outer ring has, on a second, opposite end face, a second shoulder 220 which also projects beyond the second end face in the axial direction. The outer ring 200 and its first and second shoulders 210, 220 are of circular form.

Provided so as to be spaced apart from the outer ring 200 in the radial direction is an inner ring 300 whose first end face forms a first shoulder 310 and whose opposite second end face forms a second shoulder 320.

The inner ring 300 and the outer ring 200 are connected to one another by means of webs 410. Cavities 420 that are free from filling material are formed between the webs 410.

The axial extent from the first shoulder 210 to the second shoulder 220 of the outer ring 200 corresponds to the axial extent from the first shoulder 310 to the second shoulder 320 of the inner ring 300. The axial extent from the first shoulder 210 to the second shoulder 220 of the outer ring 200 is greater than the axial extent of the two toothed rings 110, 120. Also, the axial extent from the first shoulder 310 to the second shoulder 320 of the inner ring 300 is likewise greater than the axial extent of the two toothed rings 110, 120.

A multiplicity of radially oriented webs 410, which are spaced apart from one another in a substantially equidistant manner and the axial extent of which is smaller than the axial extent from the first shoulder 210 to the second shoulder 220 of the outer ring 200 and smaller than the axial extent from the first shoulder 310 to the second shoulder 320 of the inner ring 300, are arranged between the outer ring 200 and the inner ring 300.

Figure 3A:
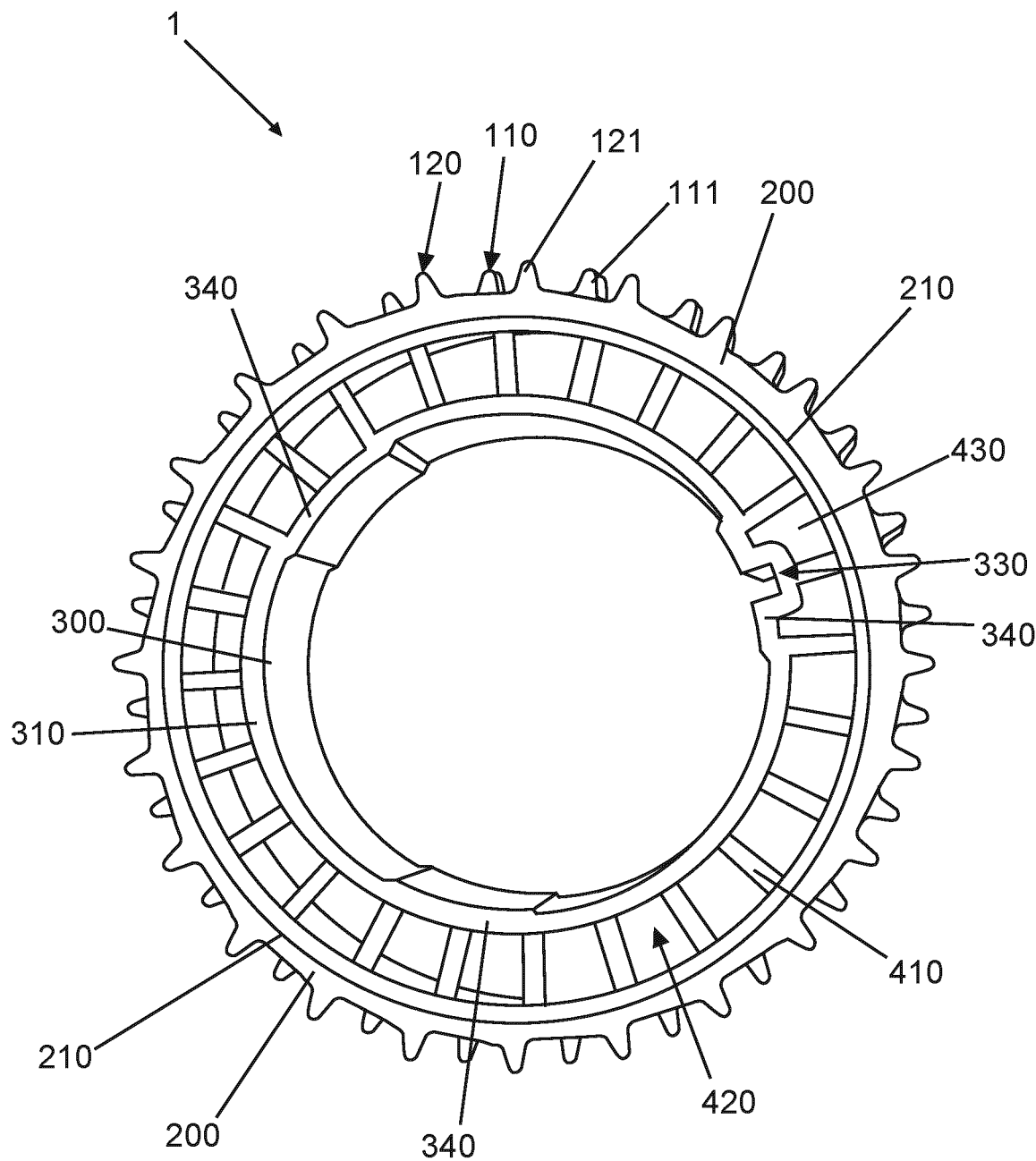
FIG. 3A shows a three-dimensional view of a further exemplary embodiment of a sprocket without a first cover disk.
Figure 3B:
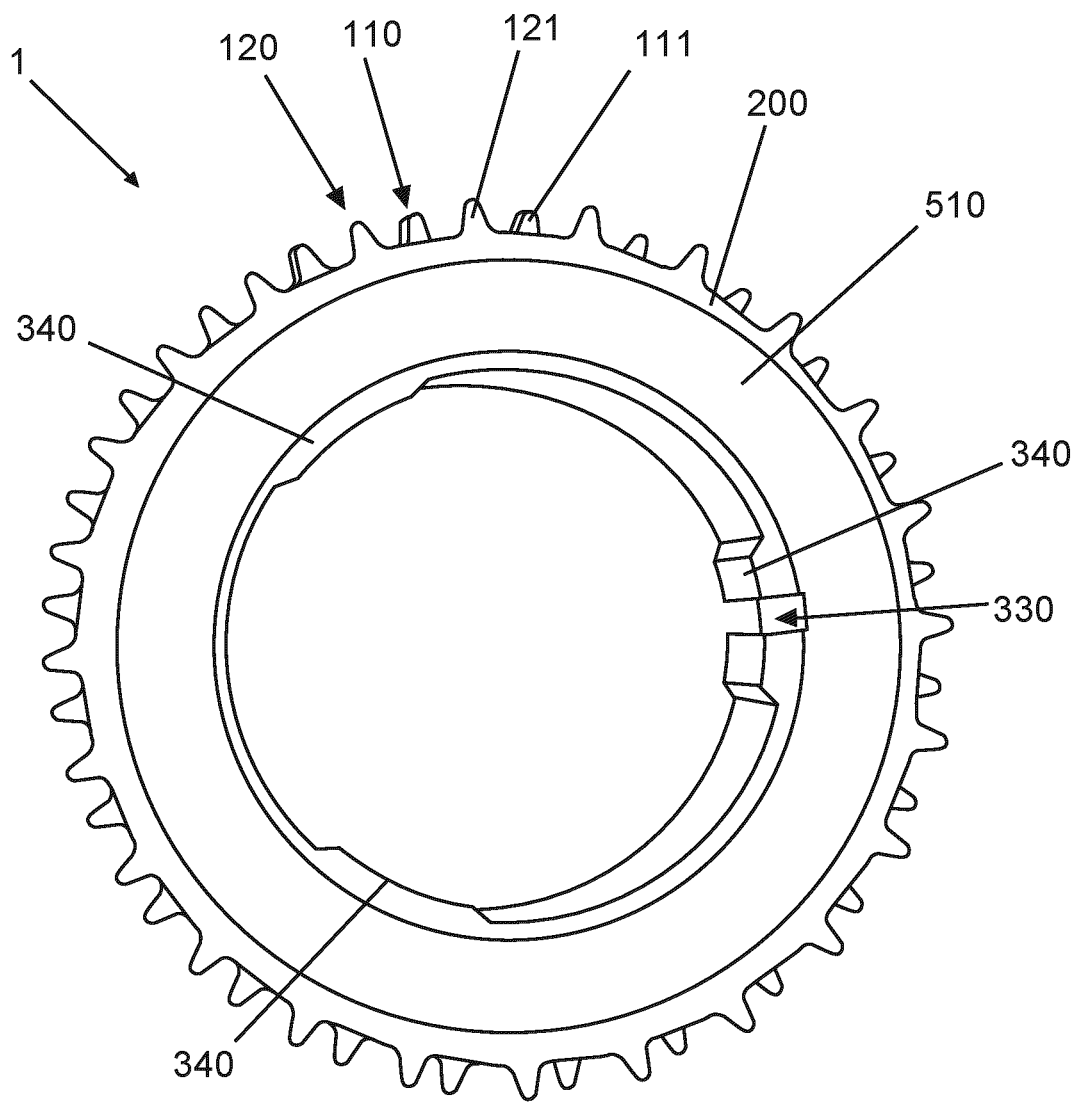
FIG. 3B shows the sprocket as per FIG. 3A with a first cover disk.

As can be seen in particular in FIG. 3A, an intermediate disk 430 which connects the outer ring 200, the inner ring 300 and the webs 410 to one another extends between the inner ring 300 and the outer ring 200 and between the webs 410. The outer ring 200, the inner ring 300, the webs 410 and the intermediate disk 430 are all designed in the form of thin-walled elements. The two toothed rings 110, 120 are also designed in the form of thin-walled elements.

In particular an element whose extent in one dimension is smaller than 5 mm, in particular has an extent in one dimension that is approximately 1 to 3 mm, may be referred to as thin-walled. In the case of the intermediate disk 430, the toothed rings 110, 120 and the outer ring 200 (without its shoulders 210, 220), this is preferably the extent in the axial direction. In the case of the inner ring 300 and the first shoulder 210 and the second shoulder 220 of the outer ring 200, this is preferably the extent in the radial direction. In the case of the webs 410, this is preferably the extent in the circumferential direction.

The inner ring 300 and the first cover disk 510 and the second cover disk 520 have exactly three projections 340 for abutment against the drive shaft. The three projections 340 protrude radially inward and extend over the entire axial length of the inner ring 300. In FIGS. 1A to C and 3A and B, one of these projections 340 has a cutout 330 at its center for receiving a parallel key 820 arranged on a drive shaft. In the case of the sprocket 1 as per FIGS. 2A to D, cutouts 330 for receiving such parallel keys are also arranged on the other two projections 340.

The first cover disk 510 and the second cover disk 520 are of annular-disk-like form and extend from the first shoulder 210 of the outer ring 200 to the first shoulder 310 of the inner ring 300 and, respectively, from the second shoulder 220 of the outer ring 200 to the second shoulder 320 of the inner ring 300.

The cover disks 510, 520 are connected to the corresponding shoulders of the outer ring 200 and inner ring 300 in a fluid-tight manner, in particular by way of a welded connection, in order to produce closed end faces of the sprocket 1, wherein a connection by means of ultrasonic welding is particularly preferred. The cavities between the webs 410 are thus sealed.

The outer circumference of the cover disks 510, 520 is of circular form and the inner circumference of the cover disks 510, 520 has, just like the inner ring 300, a cutout for a parallel key and also three projections for abutment against the drive shaft. The cover disks 510, 520 thus correspond substantially to the contours of the shoulders of the outer ring 200 and of the inner ring 300.

Figure 1A:
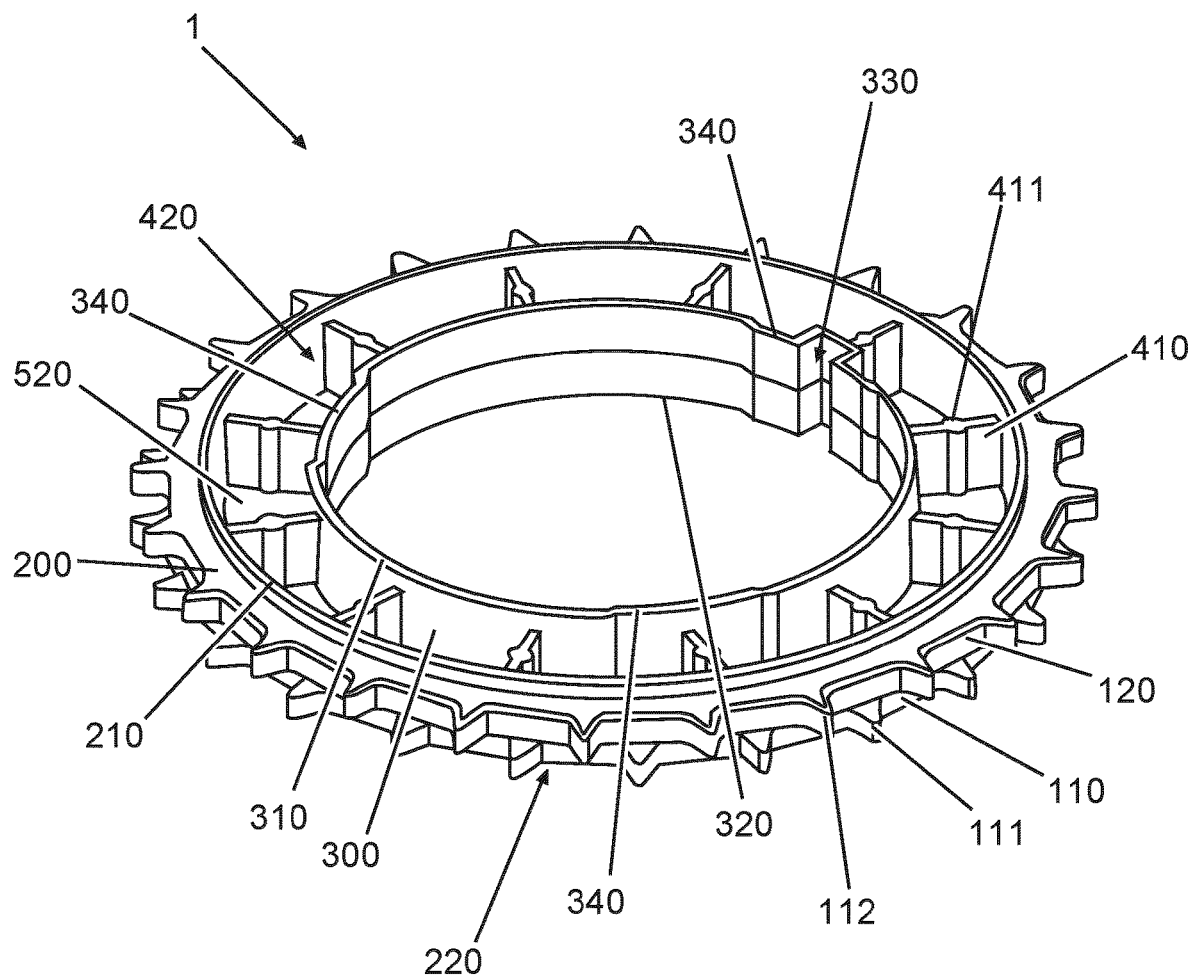
FIG. 1A shows a three-dimensional view of an exemplary embodiment of a sprocket without a first cover disk.
Figure 1B:
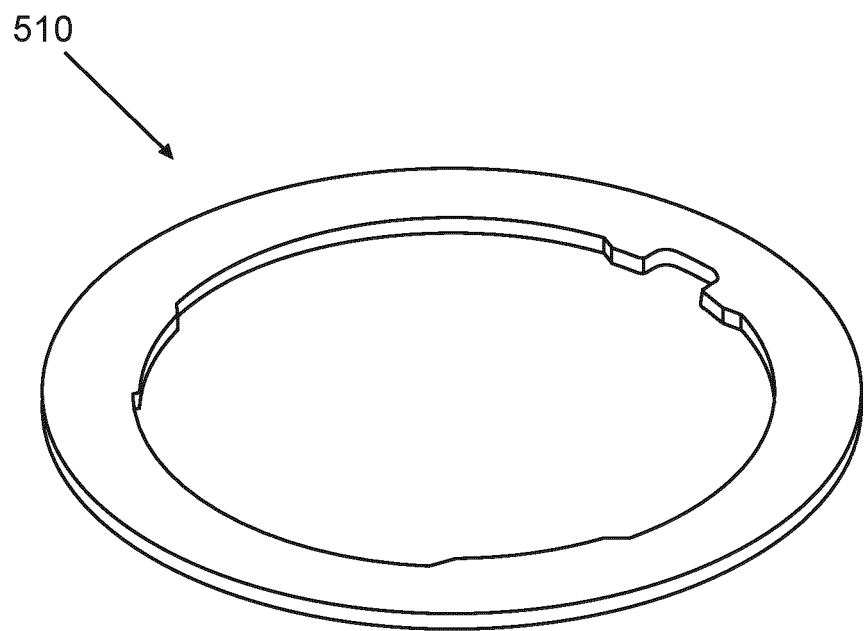
FIG. 1B shows the first cover disk for the sprocket as per FIG. 1A.
Figure 1C:
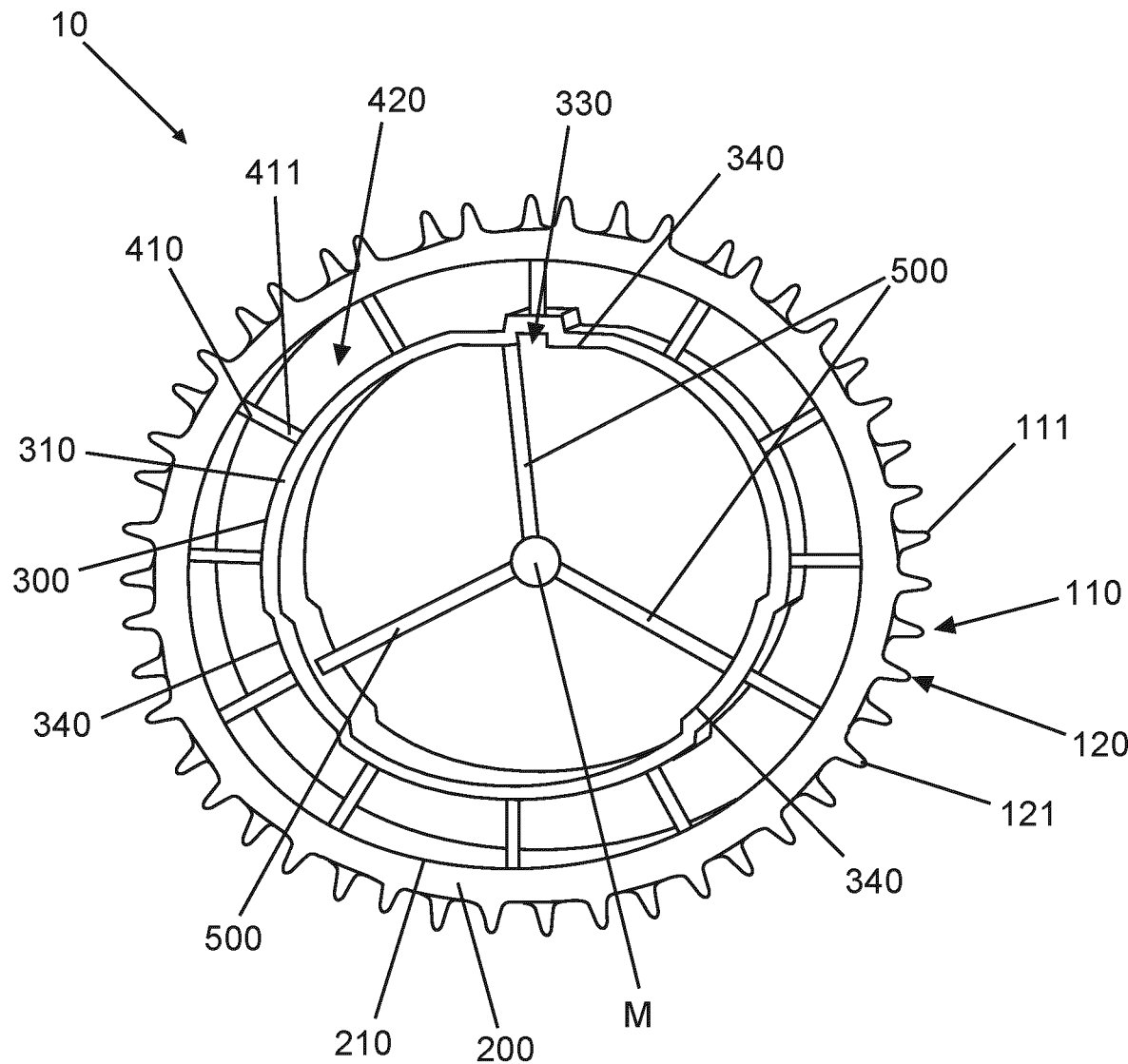
FIG. 1C shows a semi-finished sprocket product for a sprocket as per FIG. 1A.

A semi-finished sprocket product 10 for a sprocket 1 as per FIG. 1A is illustrated in FIG. 1C. The semi-finished sprocket product 10 has, proceeding from a center point M, three production webs 500 which connect an injection point corresponding to the center point M to the inner ring 300. This has advantages in particular in the case of the method 1000 described below for producing a sprocket 1.

The method 1000 for producing a sprocket 1 comprises forming 1001 the two toothed rings 110, 120 and an outer ring 200, which adjoins the toothed rings, and an inner ring 300, and also the webs 410 which connect the inner ring 300 and outer ring 200 to one another, and preferably also an intermediate disk 430. In particular, it is preferable that plastics material is injected via an injection point lying at the center point M via the production webs 500 into the inner ring 300, said plastics material passing from there via the webs 410 and the intermediate disk 430 into the outer ring 200 and the toothed rings 110, 120. The semi-finished sprocket product 10 is produced in this way.

In a step 1002, the production webs 500 are removed again.

A first cover disk 510 is formed in a step 1003, and a second cover disk 520 is formed in a step 1004. In a step 1005, these cover disks are fastened to the corresponding shoulders of the outer ring 200 and of the inner ring 300 in a fluid-tight manner, in particular by way of a welded connection by means of ultrasonic welding.

Figure 2A:
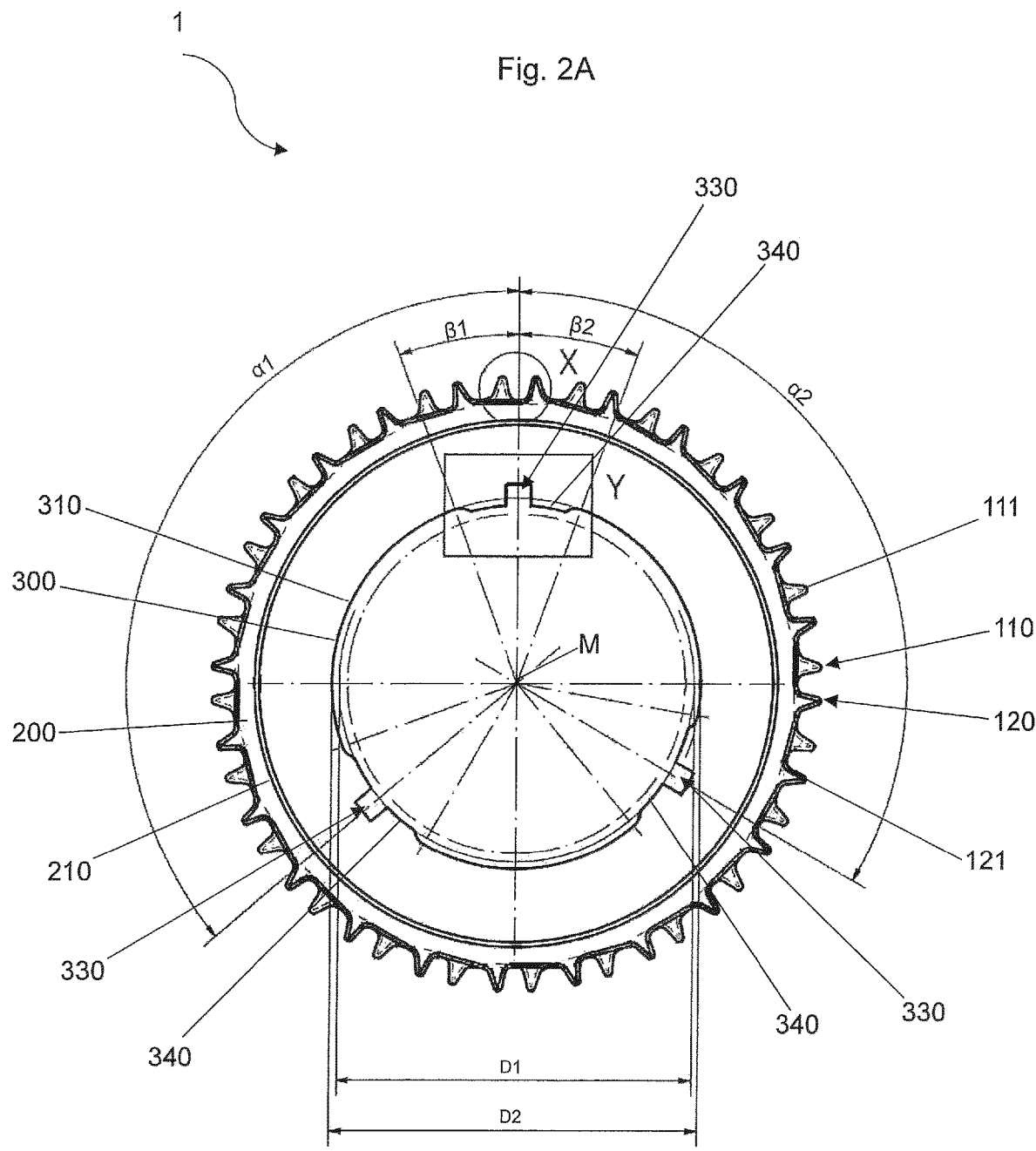
FIG. 2A shows a plan view of a further exemplary embodiment of a sprocket.
Figure 2C:
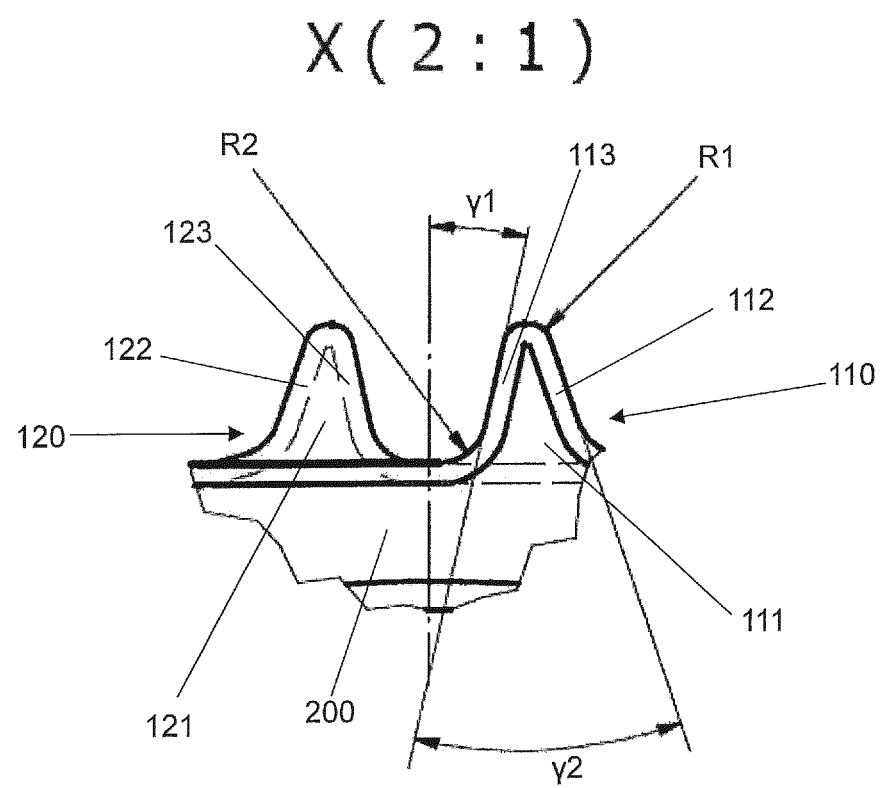
FIG. 2C shows an enlarged illustration of detail X from FIG. 2A.
Figure 2D:
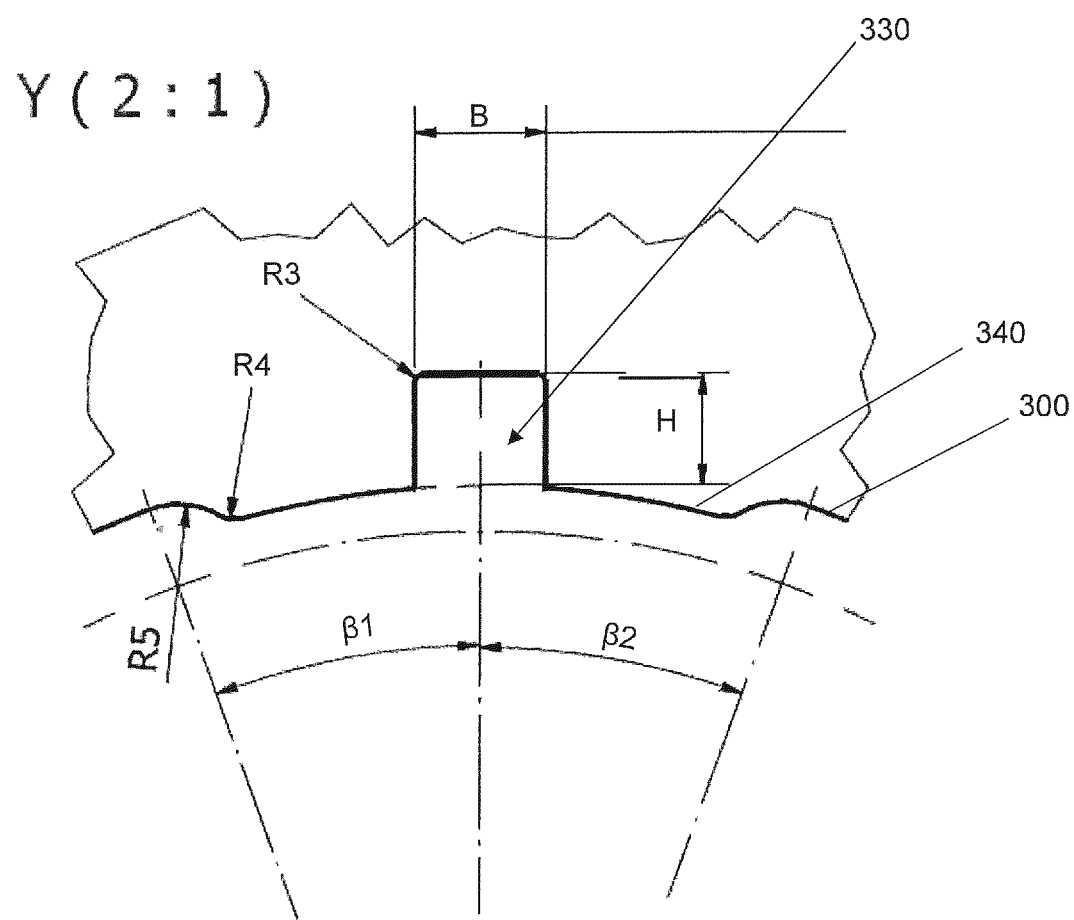
FIG. 2D shows an enlarged illustration of detail Y from FIG. 2A.

As can be seen in particular in FIG. 2D, the cutout 330 is preferably arranged centrally on one of the projections 340 of the inner ring 300 and has a width B and a height H. The transition from the projection 340 to the remaining region, which is offset radially outwardly relative thereto, of the inner ring 300 is preferably curved with a first radius R4 and a second, larger radius R5. The center angles between a center of the cutout 330 and the end of the transition from the projection 340 to the remaining region of the inner ring 300 are denoted by β1 and β2 in FIG. 2D, which are preferably the same size.

In FIG. 2A, D2 denotes the inner diameter of the inner ring 300. D1 denotes the inner diameter of the projections 340 on the inner ring 300. This diameter D1 of the projections 340 is smaller than the diameter D2 of the rest of the regions of the inner ring 300. In particular, the diameter D1 of the projections 340 on the inner ring 300 has to be produced with a high accuracy of fit since the projections 340 are intended to abut against a drive shaft and must be mounted thereon in an exact manner.

Furthermore, proceeding from the center of the upper cutout 330 in FIG. 2A, the center angles with respect to the respective centers of the left-hand and right-hand cutouts 330 in FIG. 2A are illustrated by α1 and α2. It may for example be preferred that the angle α1 is greater than the angle α2, for example by 10°.

Furthermore, FIG. 2B illustrates the axis X of the sprocket 1, said axis preferably coinciding with a longitudinal axis of the drum motor 800 in the mounted state.

FIG. 2C illustrates a section of the toothed rings 110, 120 adjoining the outer ring 200. A tooth 111 of the first toothed ring 110 and a tooth 121 of the second toothed ring 120 can be seen. The two teeth 111, 121 each have a relatively steep flank, denoted by 113, 123, and a less steep flank 112, 122. The angle of inclination of the steeper flanks 113, 123 is denoted by γ1. The angle between the two tooth flanks 112, 113 is denoted by γ2. This angle γ2 is preferably greater than the angle γ1.

The geometry of the sprocket 1 described here having a thin-walled configuration overall combined with toothed rings 110, 120 and an outer ring 200 made of solid material advantageously allows such a sprocket 1 to be cost-effectively produced by the method 1000 described here in the injection-molding process. At the same time, this configuration of the sprocket 1 permits a very high accuracy of fit with only a very small amount of warpage, with the result that a configuration of the sprocket 1 consisting of plastic is possible. The fluid-tight fastening of the cover disks 510, 520 to the shoulders of the outer ring 200 and inner ring 300 of the sprocket 1 closes the cavities 420 between the webs 410 in a fluid-tight manner, and so no contaminants can be deposited. Together with the projections 340 on the inner ring 300, which permit particularly good cleaning even of the interspace between the rest of the regions of the inner ring 300 of the sprocket 1 and the lateral surface 810 of the drum motor 800, the formation of the teeth 111, 121 of the toothed rings 110, 120 from plastic when used with plastic modular belts 900 affords a considerably lower level of wear than conventional sprockets made of high-grade steel, which predestines the sprocket 1 described here, with further advantages, in particular for hygienic applications, such as for example in the food industry.

The sprocket 1' as per FIGS. 6A to D comprises only one toothed ring 110 and an outer ring 200' which adjoins the toothed ring 110. The teeth 111, 112 are formed with tooth flanks of differing inclination. The sprocket 1' as per FIGS. 6A to D having only one toothed ring 110 is therefore also suitable for reversing operation.

The sprocket 1' as per FIGS. 7A to D comprises two toothed rings 110, 120 and an outer ring 200' which adjoins the toothed rings 110, 120. The teeth 111, 112 are arranged offset relative to one another in the circumferential direction.

Both sprockets 1' have an inner ring 300' formed from high-grade steel. The outer ring 200' directly adjoins the inner ring 300', and the webs 410' axially adjoin the inner ring 300', in particular the first end face thereof, from the outer ring 200'. The outer ring 200' is preferably injection-molded together with the webs 410' onto the inner ring 300'. The outer ring 200' and the webs 410' are preferably formed from plastic and produced in an injection-molding process.

Furthermore, the outer ring 200' partially encloses the inner ring 300', in particular the opposite end faces thereof, in the axial direction by means of the extensions 201'. The extensions 201' may be of ring-like form or may be interrupted in the circumferential direction. As a result, the outer ring 200' extends partially along the inner ring 300', in particular the opposite end faces thereof, in the radial direction. The extensions 201' may also have the shape of further webs which preferably extend only over a part of the radial extent of the inner ring 300' in the radial direction. In this way, the inner ring 300' is axially fixed relative to the outer ring 200', in particular by a form fit.

The webs 410' directly adjoin the inner ring 300', in particular an end face of the inner ring 300', in the axial direction, as a result of which a form fit, in the form of a butt-joint connection, is formed between the webs and the inner ring. Since the webs 410' are also connected to the outer ring 200', in particular to the extensions 201', there is thus preferably a connection of the outer ring to the inner ring by means of the webs.

The webs 410' are produced together with the outer ring 200' in a single, common injection-molding step and thus formed in one piece with the outer ring 200'. The webs 410' extend over a total radial extent of the inner ring 300' in the radial direction. The webs 410' taper in the radial direction from the outside inward.

The inner ring 300' has an outer circumferential surface 350 which deviates from a cylindrical shape. The outer circumferential surface 350 of the inner ring 300' has a plurality of projections 352 which are spaced apart in the circumferential direction and a plurality of indentations 351 which are spaced apart in the circumferential direction. Steps 353 which are spaced apart in the circumferential direction are formed between the projections 352 and indentations 351. The projections 352 and indentations 351 form a plurality of portions which are spaced apart in the circumferential direction and which have different radii. This non-cylindrical configuration of the outer circumferential surface 350 of the inner ring 300' has the advantage of preventing or reducing a relative movement between the inner ring 300' and the outer ring 200' in the circumferential direction.

The formation of the inner ring 300' from metal, preferably high-grade steel, has the advantage that an increased stability and/or an improved transmission of force from the drive shaft to the sprocket 1' can be obtained. At the same time, in combination with the formation of the outer ring 200', the toothed ring or the toothed rings 110, 120 and the webs 410' from plastic, the above-described advantages in relation to the use with plastic modular belts are achieved.

The invention claimed is:

1. A sprocket (1, 1') for transferring a drive power from a drive shaft, in particular from a drum motor (800), to a plastic modular belt (900), the sprocket (1, 1') comprising at least one toothed ring (110) and an outer ring (200, 200'), which adjoins the toothed ring (110), and an inner ring (300, 300'), wherein the inner ring (300, 300') and the outer ring (200, 200') are connected to one another by means of webs (410, 410'), wherein an axial extent from a first shoulder (210) to a second shoulder (220) of the outer ring (200, 200') preferably corresponds to an axial extent from the first shoulder (210) to the second shoulder (220) of the inner ring (300, 300'), and/or wherein preferably an axial extent from the first shoulder (210) to the second shoulder (220) of the outer ring (200, 200') is greater than an axial extent of the at least one toothed ring (110), preferably is greater than an axial extent of two toothed rings (110, 120), and/or an axial extent from the first shoulder (210) to the second shoulder (220) of the inner ring (300, 300') is greater than an axial extent of the at least one toothed ring (110), preferably is greater than an axial extent of two toothed rings (110, 120), and/or wherein preferably an axial extent from the first shoulder (210) to the second shoulder (220) of the outer ring (200, 200') is greater than an axial extent of the webs (410, 410'), and/or an axial extent from the first shoulder (210) to the second shoulder (220) of the inner ring (300, 300') is greater than an axial extent of the webs (410, 410'), and/or wherein preferably an axial extent from the first shoulder (210) to the second shoulder (220) of the outer ring (200, 200') is greater than an axial extent of the intermediate disk (430), and/or an axial extent from the first shoulder (210) to the second shoulder (220) of the inner ring (300, 300') is greater than an axial extent of the intermediate disk (430), and/or an axial extent of the webs (410, 410') is greater than an axial extent of the intermediate disk (430).

2. A sprocket (1, 1') for transferring a drive power from a drive shaft, in particular from a drum motor (800), to a plastic modular belt (900), the sprocket (1, 1') comprising at least one toothed ring (110) and an outer ring (200, 200'), which adjoins the toothed ring (110), and an inner ring (300, 300'), wherein the inner ring (300, 300') and the outer ring (200, 200') are connected to one another by means of webs (410, 410'), characterized by a first, in particular annular-disk-shaped, cover disk (510) which preferably extends from a first shoulder (210) of the outer ring (200, 200') to the first shoulder (310) of the inner ring (300, 300') and/or is preferably fastened to the first shoulder (210) of the outer ring (200, 200') and/or the first shoulder (310) of the inner ring (300, 300'), in particular is fastened in a fluid-tight and/or materially bonded manner and/or by way of a welded connection, and/or characterized by a second, in particular annular-disk-shaped, cover disk (520) which preferably extends from a second shoulder (220) of the outer ring (200,

200') to the second shoulder (320) of the inner ring (300, 300') and/or is preferably fastened to the second shoulder (220) of the outer ring (200, 200') and/or the second shoulder (320) of the inner ring (300, 300'), in particular is fastened in a fluid-tight and/or materially bonded manner and/or by way of a welded connection.

3. A sprocket (1, 1') for transferring a drive power from a drive shaft, in particular from a drum motor (800), to a plastic modular belt (900), the sprocket (1, 1') comprising at least one toothed ring (110) and an outer ring (200, 200'), which adjoins the toothed ring (110), and an inner ring (300, 300'), wherein the inner ring (300, 300') and the outer ring (200, 200') are connected to one another by means of webs (410, 410'), characterized in that the outer ring (200, 200') is of circular form and/or a first shoulder (210) of the outer ring (200, 200') is of circular form and/or a second shoulder (220) of the outer ring (200, 200') is of circular form, and/or characterized in that an outer circumference of the first cover disk (510) is of circular form and/or an outer circumference of the second cover disk (520) is of circular form, and/or characterized in that an inner circumference of the first cover disk (510) has a cutout (330) for a parallel key (820) and/or an inner circumference of the first cover disk (510) has projections (340), in particular exactly three projections (340), for abutment against the drive shaft, wherein the projections (340) preferably protrude radially inward, and/or wherein the cutout (330) for receiving the parallel key (820) is preferably arranged on one of the projections (340), and/or an inner circumference of the second cover disk (520) has a cutout for a parallel key (820) and/or an inner circumference of the second cover disk (520) has projections (340), in particular exactly three projections (340), for abutment against the drive shaft, wherein the projections (340) preferably protrude radially inward, and/or wherein the cutout (330) for receiving the parallel key (820) is preferably arranged on one of the projections (340).

4. A sprocket (1, 1') for transferring a drive power from a drive shaft, in particular from a drum motor (800), to a plastic modular belt (900), the sprocket (1, 1') comprising at least one toothed ring (110) and an outer ring (200, 200'), which adjoins the toothed ring (110), and an inner ring (300, 300'), wherein the inner ring (300, 300') and the outer ring (200, 200') are connected to one another by means of webs (410, 410'), characterized in that the toothed ring or the toothed rings (110, 120) and/or the outer ring (200, 200') and/or the inner ring (300, 300') and/or the webs (410, 410') and/or an intermediate disk (430) and/or a first cover disk (510) and/or a second cover disk (520) are composed of solid material, in particular plastic or metal, wherein the toothed ring or the toothed rings (110, 120) and/or the outer ring (200, 200') and/or the webs (410, 410') and/or the intermediate disk (430) and/or the first cover disk (510) and/or the second cover disk (520) are preferably composed of plastic and/or comprise plastic, and/or wherein the inner ring (300, 300') is preferably composed of metal and/or comprises metal, and/or characterized in that the toothed ring or the toothed rings (110, 120) and/or the outer ring (200, 200') and/or the inner ring (300, 300') and/or the webs (410, 410') and/or the intermediate disk (430) and/or the first cover disk (510) and/or the second cover disk (520) are produced in an injection-molding process, wherein the toothed ring or the toothed rings (110, 120) and the outer ring (200, 200') and the inner ring (300, 300') and the webs (410, 410') and the intermediate disk (430) are preferably produced in a single, common injection-molding step, and/or characterized in that the toothed ring or the toothed rings (110, 120) and/or the outer ring (200, 200') and/or the webs (410, 410') and/or the intermediate disk (430) and/or the first cover disk (510) and/or the second cover disk (520) are produced in an injection-molding process, wherein the toothed ring or the toothed rings (110, 120) and the outer ring (200, 200') and the webs (410, 410') are preferably produced in a single, common injection-molding step, and/or wherein the toothed ring or the toothed rings (110, 120) and the outer ring (200, 200') and the webs (410, 410') are preferably injection-molded onto the inner ring (300, 300'), and/or characterized in that the cavities (420) between the webs (410, 410') are free from filling material.

5. A method (1000) for producing a sprocket (1, 1') for transferring a drive power from a drive shaft, in particular from a drum motor (800), to a plastic modular belt (900), the sprocket (1, 1') comprising at least one toothed ring (110) and an outer ring (200, 200'), which adjoins the toothed ring (110), and an inner ring (300, 300'), wherein the inner ring (300, 300') and the outer ring (200, 200') are connected to one another by means of webs (410, 410'), the method comprising forming at least one toothed ring (110) and an outer ring (200, 200'), which adjoins the toothed ring, and an inner ring (300, 300'), wherein the inner ring (300, 300') and the outer ring (200, 200') are connected to one another by means of webs (410, 410'), forming a first, in particular annular-disk-shaped, cover disk (510) which preferably extends from a first shoulder (210) of the outer ring (200, 200') to the first shoulder (310) of the inner ring (300, 300'), and/or fastening the first cover disk (510) to the first shoulder (210) of the outer ring (200, 200') and/or the first shoulder (310) of the inner ring (300, 300'), in particular in a fluid-tight and/or materially bonded manner and/or by way of a welded connection, and/or forming a second, in particular annular-disk-shaped, cover disk (520) which preferably extends from a second shoulder (220) of the outer ring (200, 200') to the second shoulder (320) of the inner ring (300, 300'), and/or fastening the second cover disk (520) to the second shoulder (220) of the outer ring (200, 200') and/or the second shoulder (320) of the inner ring (300, 300'), in particular in a fluid-tight and/or materially bonded manner and/or by way of a welded connection.

6. A method (1000) for producing a sprocket (1, 1') for transferring a drive power from a drive shaft, in particular from a drum motor (800), to a plastic modular belt (900), the sprocket (1, 1') comprising at least one toothed ring (110) and an outer ring (200, 200'), which adjoins the toothed ring (110), and an inner ring (300, 300'), wherein the inner ring (300, 300') and the outer ring (200, 200') are connected to one another by means of webs (410, 410'), the method is characterized in that at least one toothed ring (110) and an outer ring (200, 200') are formed, which adjoins the toothed ring, and an inner ring (300, 300'), wherein the inner ring (300, 300') and the outer ring (200, 200') are connected to one another by means of webs (410, 410'), characterized in that the toothed ring or the toothed rings (110, 120) and/or the outer ring (200, 200')

and/or the inner ring (300, 300') and/or the webs (410, 410') and/or an intermediate disk (430) and/or the first cover disk (510) and/or the second cover disk (520) are produced from solid material, in particular plastic or metal, wherein the toothed ring or the toothed rings (110, 120) and/or the outer ring (200, 200') and/or the webs (410, 410') and/or the intermediate disk (430) and/or the first cover disk (510) and/or the second cover disk (520) preferably are or have been produced from and/or with plastic, and/or wherein the inner ring (300, 300') preferably is or has been produced from and/or with metal, and/or characterized in that the toothed ring or the toothed rings (110, 120) and/or the outer ring (200, 200') and/or the inner ring (300, 300') and/or the webs (410, 410') and/or the intermediate disk (430) and/or the first cover disk (510) and/or the second cover disk (520) are produced in an injection-molding process, wherein the toothed ring or the toothed rings (110, 120) and the outer ring (200, 200') and the inner ring (300, 300') and the webs (410, 410') and the intermediate disk (430) are preferably produced in a single, common injection-molding step, and/or characterized in that the toothed ring or the toothed rings (110, 120) and/or the outer ring (200, 200') and/or the webs (410, 410') and/or the intermediate disk (430) and/or the first cover disk (510) and/or the second cover disk (520) are or have been produced in an injection-molding process, wherein the toothed ring or the toothed rings (110, 120) and the outer ring (200, 200') and the webs (410, 410') preferably are or have been produced in a single, common injection-molding step, and/or wherein the toothed ring or the toothed rings (110, 120) and the outer ring (200, 200') and the webs (410, 410') preferably are or have been injection-molded onto the inner ring (300, 300'), and/or characterized in that a semi-finished sprocket product is initially produced which has, proceeding from a center point, production webs (500), in particular exactly three production webs (500), which preferably connect an injection point corresponding in particular to the center point, and/or two or more injection points assigned in each case to one or more production webs, to the inner ring (300, 300') and/or the webs (410, 410').

\* \* \* \* \*